United States Patent
Jaffer

(10) Patent No.: US 8,730,092 B2
(45) Date of Patent: May 20, 2014

(54) MULTISTATIC TARGET DETECTION AND GEOLOCATION

(75) Inventors: Amin G. Jaffer, Fullerton, CA (US); David Miranda, legal representative, Fullerton, CA (US)

(73) Assignee: Raytheon Company, Waltham, MA (US)

( * ) Notice: Subject to any disclaimer, the term of this patent is extended or adjusted under 35 U.S.C. 154(b) by 134 days.

(21) Appl. No.: 13/041,311

(22) Filed: Mar. 4, 2011
(Under 37 CFR 1.47)

(65) Prior Publication Data
US 2012/0056772 A1    Mar. 8, 2012

Related U.S. Application Data

(60) Provisional application No. 61/331,375, filed on May 4, 2010.

(51) Int. Cl.
G01S 13/00    (2006.01)
(52) U.S. Cl.
USPC ........... 342/99; 342/89; 342/98; 342/159; 342/175
(58) Field of Classification Search
USPC ........ 342/27, 28, 89, 98–103, 104, 107, 109, 342/113, 118, 146, 159–164, 175
See application file for complete search history.

(56) References Cited

U.S. PATENT DOCUMENTS

| | | | | |
|---|---|---|---|---|
| 3,795,911 A * | 3/1974 | Hammack | ..................... | 342/106 |
| 4,488,154 A * | 12/1984 | Ward | ........................... | 342/162 |
| 4,825,213 A * | 4/1989 | Smrek | ......................... | 342/25 B |
| 5,160,931 A * | 11/1992 | Brown | ......................... | 342/25 C |
| 5,434,570 A * | 7/1995 | Wurman | ..................... | 342/26 D |
| 5,617,099 A * | 4/1997 | Warren et al. | ................. | 342/159 |
| 6,232,922 B1 * | 5/2001 | McIntosh | ...................... | 342/453 |
| 6,400,306 B1 * | 6/2002 | Nohara et al. | .............. | 342/25 R |
| 6,747,593 B1 * | 6/2004 | Jaffer | ............................ | 342/160 |
| 6,956,523 B2 * | 10/2005 | Mohan | ......................... | 342/133 |
| 7,006,034 B1 * | 2/2006 | Krikorian et al. | ............. | 342/159 |
| 7,038,618 B2 * | 5/2006 | Budic | ........................... | 342/195 |
| 7,119,732 B1 * | 10/2006 | Lam et al. | ...................... | 342/27 |

(Continued)

OTHER PUBLICATIONS

Jaffer, A.G., et al.; Generalized Likelihood Ratio Methods for Pre-Detection Fusion in Multistatic Radar Systems, Adaptive Sensor Array Processing Workshop, MIT Lincoln Laboratory, Jun. 2006.

(Continued)

*Primary Examiner* — Peter Bythrow
(74) *Attorney, Agent, or Firm* — Christie, Parker & Hale, LLP

(57) ABSTRACT

Aspects of this invention are directed to the substantially improved detection and geolocation accuracy of targets (stationary or moving) by using the coherent data received at multiple airborne sensors. Further aspects are directed to aligning the (unknown) time-delayed and Doppler-shifted signals received at the multiple sensors relative to an arbitrary reference sensor, which depend on the unknown target position. This results in the target position and velocity vectors being simultaneously estimated and the detection peak enhanced by obtaining near coherent gain. Still further aspects are directed to the coherent generalized likelihood ratio test (GLRT) and the minimum variance distortionless response (MVDR) statistic for multistatic radar systems, conditioned on estimation of certain parameters that render the system coherent. Analytical and computer simulation results are presented to show substantially enhanced detection and geolocation of moving targets in clutter.

20 Claims, 23 Drawing Sheets

(56) References Cited

U.S. PATENT DOCUMENTS

| | | |
|---|---|---|
| 7,173,560 B2* | 2/2007 | Li et al. .................... 342/22 |
| 7,205,930 B2* | 4/2007 | Ho et al. ................... 342/126 |
| 7,369,083 B2* | 5/2008 | Budic ........................ 342/159 |
| 7,518,543 B2* | 4/2009 | Herberthson ............... 342/59 |
| 7,548,199 B2* | 6/2009 | Winternitz et al. ...... 342/357.63 |
| 7,570,197 B2* | 8/2009 | Takano et al. ............ 342/70 |
| 2002/0167440 A1* | 11/2002 | Baugh ........................ 342/159 |
| 2003/0218565 A1* | 11/2003 | Budic ........................ 342/90 |
| 2005/0012657 A1* | 1/2005 | Mohan ....................... 342/133 |
| 2005/0128125 A1* | 6/2005 | Li et al. .................... 342/22 |
| 2005/0156780 A1* | 7/2005 | Bonthron et al. ......... 342/107 |
| 2005/0237236 A1* | 10/2005 | Budic ........................ 342/159 |
| 2006/0082496 A1* | 4/2006 | Winternitz et al. ...... 342/357.06 |
| 2006/0238407 A1* | 10/2006 | Bourdelais et al. ...... 342/90 |
| 2007/0109182 A1* | 5/2007 | Budic ........................ 342/195 |
| 2007/0247353 A1* | 10/2007 | Budic ........................ 342/159 |
| 2009/0066574 A1* | 3/2009 | De Lorenzo et al. .... 342/357.12 |
| 2009/0141775 A1* | 6/2009 | Kober et al. .............. 375/148 |

OTHER PUBLICATIONS

Jaffer, A.G., et al.; Combined GLRT Processing Methods for Multistatic Radar Systems, Proceedings Tri-Service Radar Symposium, May 2007.

Guerci, J.R.; Space-Time Adaptive Processing for Radar, ARTECH House, May 2003.

Haykin, S.; Adaptive Filter Theory, 3rd Edition, Prentice-Hall, 1996.

Whalen, A.D.; Detection of Signals in Noise, Academic Press, 1971.

Written Opinion of the International Searching Authority for International Application No. PCT/US2011/027314, filed Mar. 4, 2011, Written Opinion dated May 2, 2011 and mailed May 20, 2011 (4 pgs.).

International Search Report for International Application No. PCT/US2011/027314, filed Mar. 4, 2011, International Search Report dated May 2, 2011 and mailed May 20, 2011 (2 pgs.).

* cited by examiner

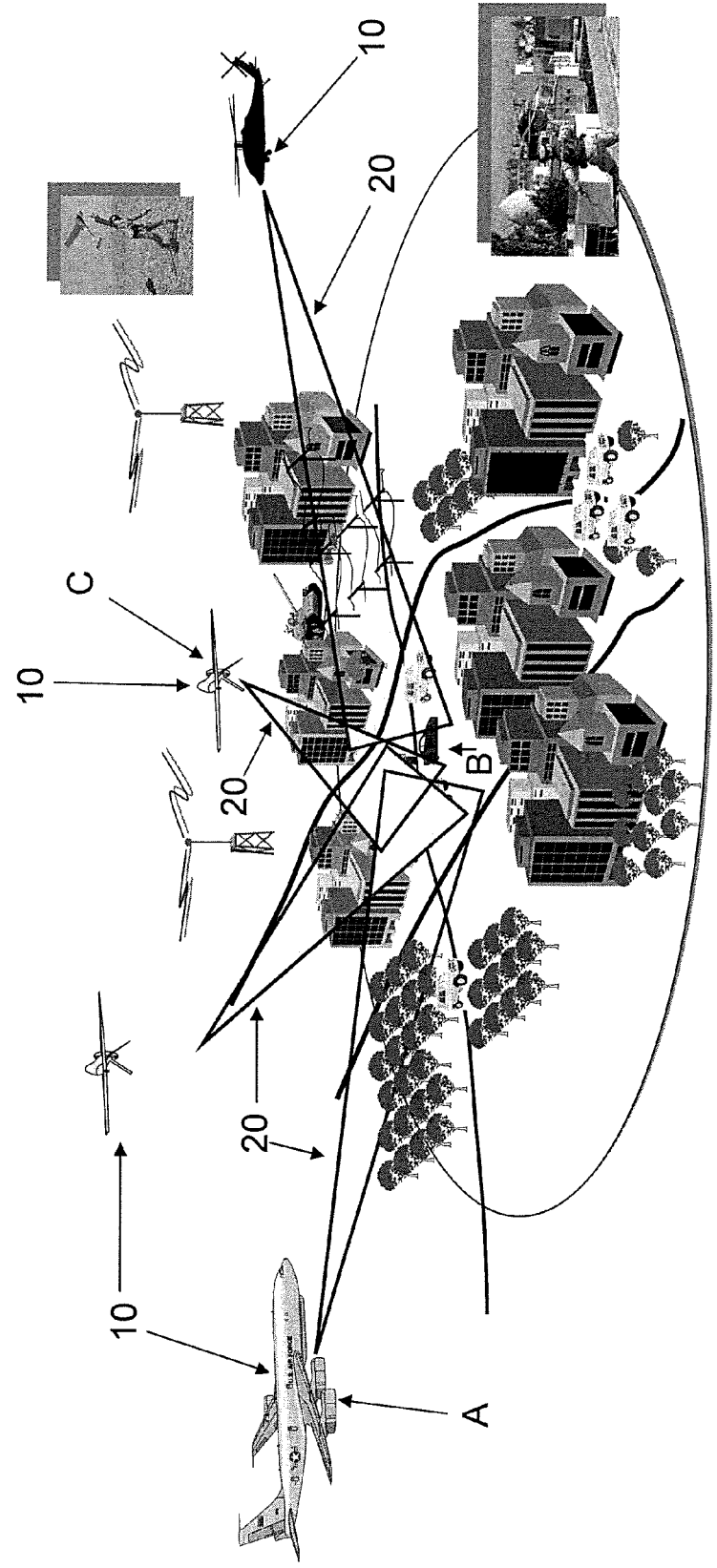

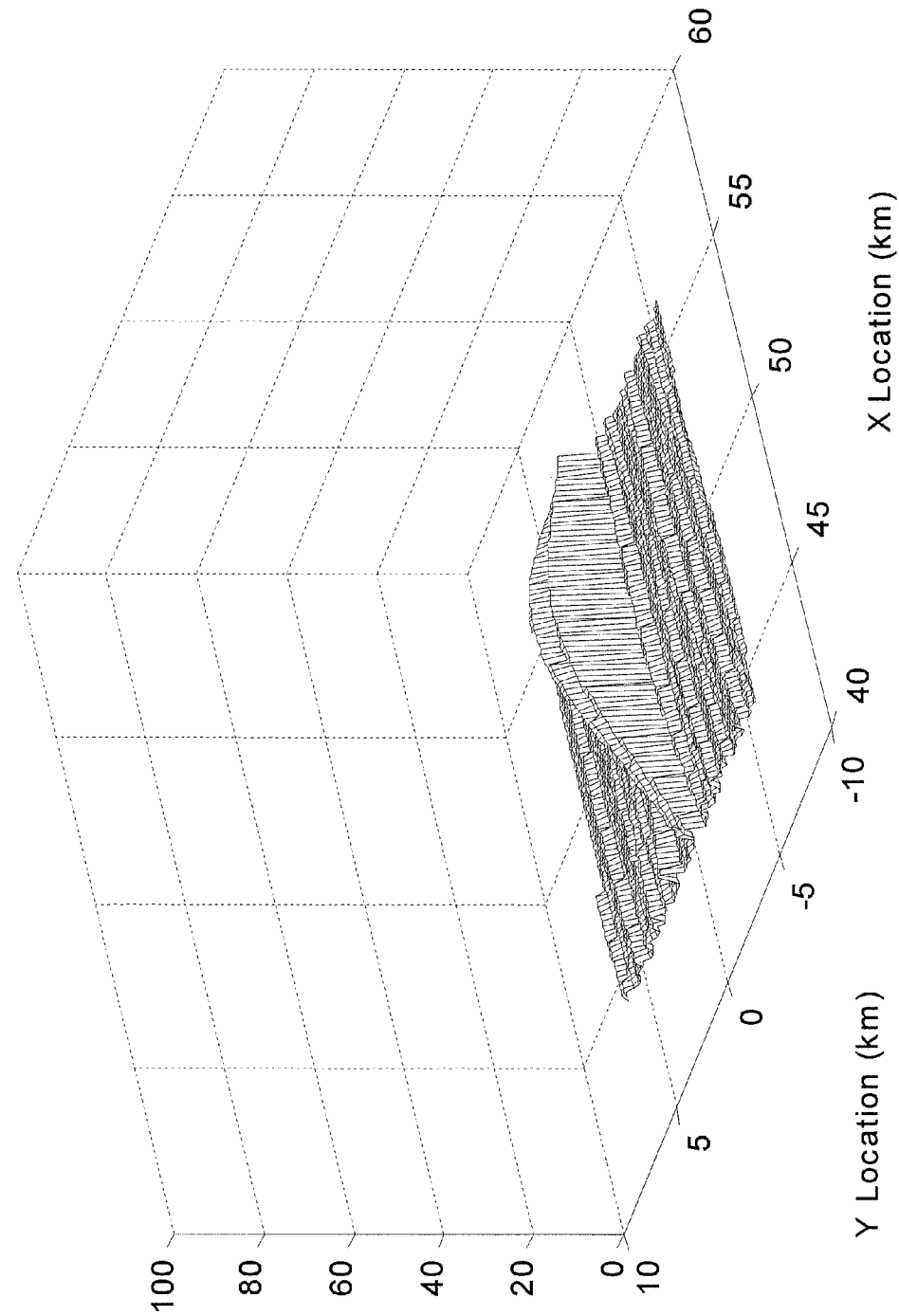

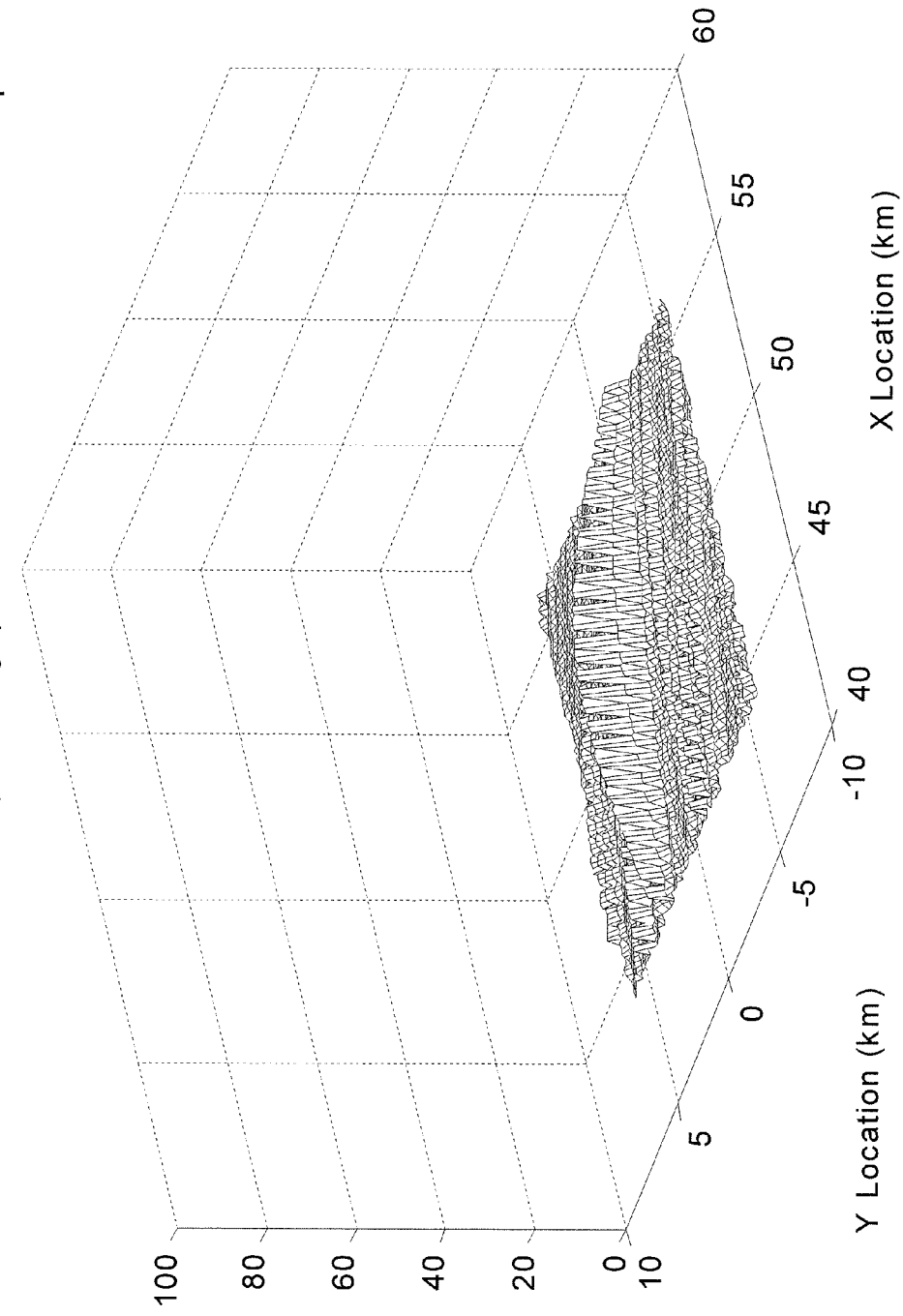

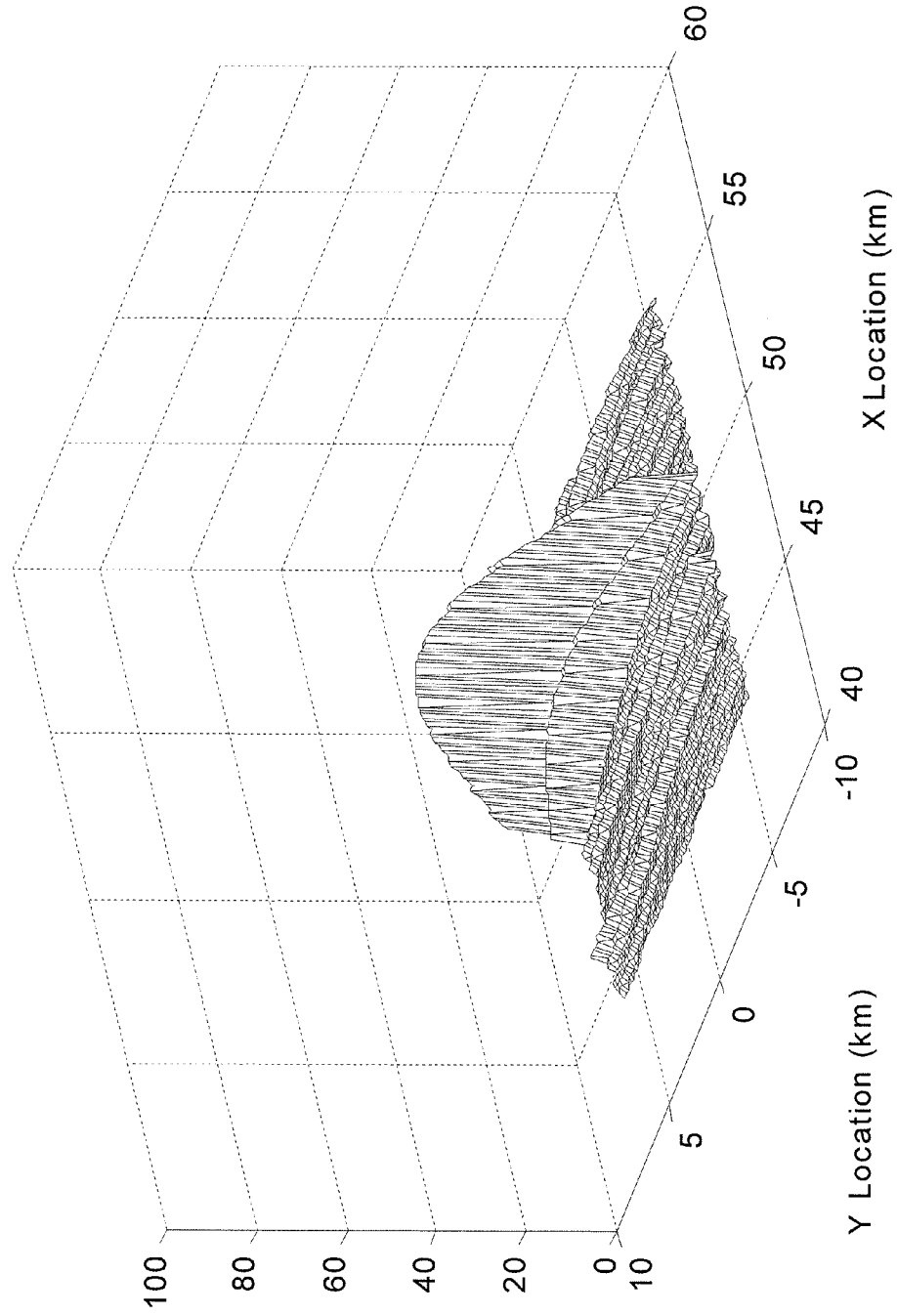

MULTISTATIC TARGET DETECTION AND GEOLOCATION

CROSS-REFERENCE TO RELATED APPLICATION(S)

This application claims priority to and the benefit of U.S. Provisional Patent Application No. 61/331,375, entitled "MULTISTATIC TARGET DETECTION AND GEOLOCATION," filed on May 4, 2010 in the U.S. Patent and Trademark Office, the entire content of which is herein incorporated by reference.

STATEMENT REGARDING FEDERALLY SPONSORED RESEARCH OR DEVELOPMENT

This invention disclosure is related to Government contract number FA8750-05-C-0231, entitled "Generalized Likelihood Ratio Processing Methods for Multistatic Radar Systems," awarded by the U.S. Air Force. The U.S. Government has certain rights in this invention.

BACKGROUND

1. Field

Aspects of embodiments according to the present invention relate in general to signal processing and more particularly to signal processing of multiple sensor data to enhance detection and geolocation of targets.

2. Description of Related Art

The detection and geolocation accuracy of targets (stationary or moving) by using multistatic data, such as the radar signal data received by multiple sensors (for example, airborne sensors), can present many problems. One possibility to address one or more of these problems is to use post-detection fusion of the multiple receivers' data. However, if one or more of the receivers has a low signal-to-noise ratio (SNR) while the others may have high SNR, the target geolocation accuracy may be seriously degraded. Another possibility is to use individual sensor range and Doppler measurements to detect and geolocate targets. However, this technique may not result in combined processing gain that can be obtained from multiple receivers, and it may be more difficult to detect or geolocate targets in clutter, especially slow moving targets. Yet another possibility is to use noncoherent combined processing. This, however, fails to make use of coherent data from multiple sensors. A still other possibility is to use post-detection measurements (bistatic range, bistatic Doppler) to geolocate the target. This approach, however, assumes that detection has already been performed and yielded "good" measurements, which is not generally true under low SNR conditions.

The need to improve air and ground moving target indication in difficult environments may necessitate the use of multiple spatially-separated receiving sensors deployed with one or more transmitters, which can also be referred to as a multistatic radar system. The use of a multistatic radar system can provide a significant improvement in target detection and geolocation performance, especially for slow moving targets embedded in clutter.

SUMMARY

Embodiments of this invention are directed to the detection and geolocation accuracy of targets (stationary or moving) by using the coherent data received at multiple sensors (for example, airborne sensors). More specifically, embodiments are directed at the detection and geolocation of stationary or moving targets by combining (I, Q) data (that is, in-phase and quadrature data) obtained at multiple airborne receivers (pre-detection fusion) in a clutter environment. In further detail, embodiments are directed to addressing the problem of combining the data received in multiple airborne receive sensors to enhance detection and geolocation of targets in clutter.

Further embodiments are directed to aligning the (unknown) time-delayed and Doppler-shifted signals received at the multiple sensors relative to an arbitrary reference sensor, which depends on the unknown target position and velocity. This may result in the target position and velocity vectors being simultaneously estimated and the detection peak enhanced by obtaining near coherent gain from the multiple sensors.

Embodiments are directed to the modeling of the signals received at the multiple sensors in terms of the unknown target position and velocity vectors. In addition, embodiments are directed to the development of a combined likelihood function that utilizes the above modeling and results in a function of the unknown target position and velocity vectors. Embodiments are further directed to the computationally efficient maximization of the function. Further embodiments are directed to the development of a generalized combined minimum variance distortionless response (generalized MVDR) method, which detects and resolves target from clutter using multiple sensors.

The work reported here addresses the problem of combining and processing the spatial-temporal return data received at multiple airborne sensors, resulting from signal transmissions from an airborne transmitter, with the goal being to enhance the detection of moving targets in clutter and simultaneously improve target localization accuracy and tracking. As is known, the surface clutter returns observed in airborne bistatic radar systems (that is, one transmitter and a separated receiver) exhibit a Doppler spread that tends to mask the detection of slow moving targets in clutter. The spatial diversity afforded by a multistatic system allows, however, diverse "views" of the target and clutter returns to be obtained and the possibility of combining them to enhance target detection.

The present application considers the conditional coherent case, i.e., the situation where the target return is regarded as coherent across the multiple separate receivers subject to the estimation of certain parameters pertaining to the reception of the signal in the different receivers. In particular, it is assumed that the target return signal received in any particular i'th receiver can be modeled as being related to that received in some reference receiver in terms of the (unknown) path length difference between the target and the i'th receiver, and the target and the reference receiver. The phase difference of the target return signal in the receivers is proportional to this path length difference and its power is inversely proportional to the square of the same path length difference. It is assumed, however, for some embodiments that the target bistatic cross-section is essentially constant in the directions of the multiple receivers and does not result in decorrelation of the target return signals in the various receivers. This condition may hold approximately if the angular separation of the various receivers is small.

In an exemplary embodiment according to the present invention, a multistatic radar system is provided. The multistatic radar system includes a transmitter for transmitting signals to reflect off a target, a plurality of spatially separated receivers for receiving the reflected signals from the target, and a signal processor for fusing the received reflected signals from the receivers. The fusing of the received reflected signals includes aligning the received reflected signals in time delay and Doppler shift, and summing the resulting aligned signals to detect or geolocate the target.

The summing of the resulting aligned signals may include non-coherently summing the resulting aligned signals.

The aligning of the received reflected signals in time delay and Doppler shift may include generating and applying a non-coherent Generalized Likelihood Ratio Test (GLRT) statistic.

The summing of the resulting aligned signals may include coherently summing the resulting aligned signals.

The aligning of the received reflected signals in time delay and Doppler shift may include generating and applying a coherent Generalized Likelihood Ratio Test (GLRT) statistic.

The aligning of the received reflected signals in time delay and Doppler shift may include generating and applying a coherent minimum variance distortionless response (MVDR) statistic.

The aligning of the received reflected signals in time delay and Doppler shift may include modeling location and velocity vectors of the target.

The fusing of the received reflected signals may include representing a state vector of the target in a centralized Cartesian coordinate system over all receivers.

The detection or geolocation of the target may be decided when the summing of the resulting aligned signals exceeds a threshold.

The target may include a moving target in clutter, and the fusing of the received reflected signals may include detecting or geolocating the target in the clutter.

In another exemplary embodiment according to the present invention, a method of detection and geolocation of a target by a multistatic radar system is provided. The multistatic radar system includes a transmitter, a plurality of spatially separated receivers, and a signal processor. The method includes transmitting signals from the transmitter to the target, which produces reflected signals off the target, receiving the reflected signals in the receivers, and fusing the received reflected signals. The fusing of the received reflected signals includes aligning the received reflected signals in time delay and Doppler shift, and summing the resulting aligned signals to detect or geolocate the target.

The summing of the resulting aligned signals may include non-coherently summing the resulting aligned signals.

The aligning of the received reflected signals in time delay and Doppler shift may include generating and applying a non-coherent Generalized Likelihood Ratio Test (GLRT) statistic.

The summing of the resulting aligned signals may include coherently summing the resulting aligned signals.

The aligning of the received reflected signals in time delay and Doppler shift may include generating and applying a coherent Generalized Likelihood Ratio Test (GLRT) statistic.

The aligning of the received reflected signals in time delay and Doppler shift may include generating and applying a coherent minimum variance distortionless response (MVDR) statistic.

The aligning of the received reflected signals in time delay and Doppler shift may include modeling location and velocity vectors of the target.

The fusing of the received reflected signals may include representing a state vector of the target in a centralized Cartesian coordinate system over all receivers.

The detection or geolocation of the target may be decided when the summing of the resulting aligned signals exceeds a threshold.

The target may include a moving target in clutter, and the fusing of the received reflected signals may include detecting or geolocating the target in the clutter.

Embodiments of this invention address the problem of improved detection and geolocation accuracy of targets (stationary or moving) using the coherent data received at multiple (airborne) sensors by modeling the unknown time delays and Doppler shifts of the signals received at the multiple sensors in terms of the unknown target position and velocity vectors and maximizing a combined processing function in terms of these unknown target position and velocity vectors. This procedure results in combined coherent processing detection gain and simultaneous improved geolocation accuracy.

BRIEF DESCRIPTION OF THE DRAWINGS

The accompanying drawings, together with the specification, illustrate exemplary embodiments of the present invention and, together with the description, serve to explain aspects and principles of the present invention.

FIG. 1A is a perspective view of a multistatic radar system in accordance with one embodiment of the invention.

FIG. 3A is a graph of the generalized likelihood ratio test (GLRT) statistic versus target Cartesian position (x, y) for a first receiver (Receiver 1) in a multistatic radar system in accordance with one embodiment of the invention.

FIG. 3B is a graph of the GLRT statistic versus target Cartesian position (x, y) for a second receiver (Receiver 2) in the multistatic radar system used in FIG. 3A.

FIG. 3C is a graph of the GLRT statistic versus target Cartesian position (x, y) for a third receiver (Receiver 3) in the multistatic radar system used in FIG. 3A.

DETAILED DESCRIPTION

Figure 1B:
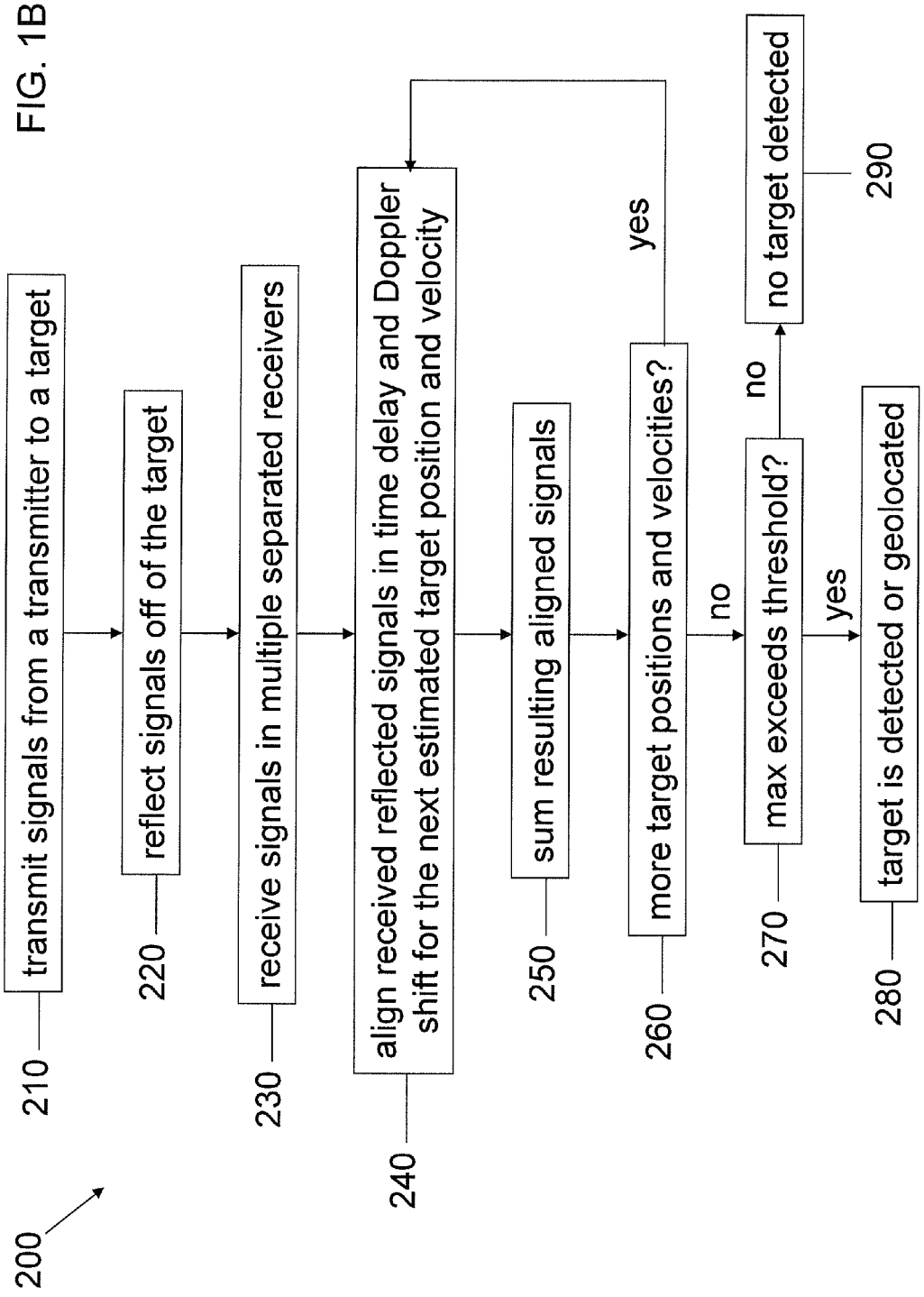
FIG. 1B illustrates an exemplary multistatic processing with fusion method in accordance with one embodiment of the invention.

Hereinafter, exemplary embodiments of the invention will be described in more detail with reference to the accompanying drawings. In the drawings, like reference numerals refer to like elements throughout.

A related problem is addressed in U.S. Pat. No. 6,747,593, entitled "Generalized Clutter Tuning for Bistatic Radar Systems," the entire content of which is incorporated herein by reference.

FIG. 1A is a perspective view of a multistatic radar system in accordance with one embodiment of the invention. The system includes a number of radar sensors or receivers 10 positioned at multiple locations. In addition, there is (at least) one transmission source of radar signals. For example, the radar sensor labeled A can be a transmission source of the radar signals that are directed at potential targets (such as vehicles B). Each such radar receiver 10 receives a corresponding radar signal 20 reflected off potential targets and nearby clutter. In addition, a signal processor (for example, a computer configured to do signal processing and located on radar sensor A) can collect all of the received reflected signals 20 from the separate receivers 10 and fuse them to resolve individual targets.

Data obtained at multiple sensors 10 differ from an arbitrary first sensor (for example, radar sensor C) in signal complex amplitude, time delay, and Doppler shift, which depend on the unknown target position and velocity vectors. Accordingly, embodiments of the invention tend to "align" the received signals in time delay and Doppler shift and noncoherently or coherently sum the resulting "aligned" signals. That is, the signal processor can simulate different target locations and velocities, and the effects this would have on the resulting reflected signals to the different sensors 10. This may simultaneously result in target geolocation and enhanced detection of target. For example, the signal processor can consider multiple target positions and velocities, and simulate the effect that each such combination of target position and velocity would have on the corresponding reflected signals as received by each of the receivers. Simulated signals that resemble the actual received signals 20 from the sensors 10 (i.e., that make the data coherent between the different sensors 10) are much more likely to correspond to the true target position and velocity.

FIG. 1B illustrates an exemplary multistatic processing with fusion method 200 in accordance with one embodiment of the invention. The method 200 is for detecting and geolocating a target by a multistatic radar system that includes a transmitter, a plurality of spatially separated receivers, and a signal processor. The method 200 includes transmitting signals 210 from the transmitter to the target. The transmitted signals reflect 220 off the target, producing reflected signals. The reflected signals are then received 230 in each of the receivers, where the signals are received with different amplitudes, phases, and Doppler shifts depending on factors such as the distance between the receiver and the target as well as the relative velocity between the receiver and the target.

At this point, the received reflected signals are fused (steps 240-260) in the signal processor. By representing each of the receivers and potential target positions and velocities in a common Cartesian three-dimensional coordinate system, the signal processor is able to efficiently fuse the separately received reflected signals to detect and geolocate the target. The fusing includes aligning 240 the received reflected signals in time delay and Doppler shift. That is, the possible target positions and velocities are considered; from which corresponding expected received reflected signals, steering vectors, etc., in each of the receivers can be estimated. For each target position and velocity being considered, these expected values can be combined with the received reflected signals to generate statistical values for each receiver. These statistical values can be, for example, coherent or noncoherent statistics, as described below. The resulting values can then be summed 250 to create a "score" for the particular combination of target position and velocity vectors under consideration.

After each such score is generated, a check 260 can be made to see if any other target positions or velocities need to be considered. If so, processing resumes with step 240 using the next target position and velocity. If not, the maximum score among the considered target positions and velocities can then be compared 270 to a particular threshold (for example, a predetermined threshold). If the maximum score exceeds the threshold, a match can be declared 280, with a target detected at the corresponding position and having the corresponding velocity. Otherwise, no match is declared 290, and no target is detected.

Noncoherent Multistatic GLRT Statistic

Figure 2:
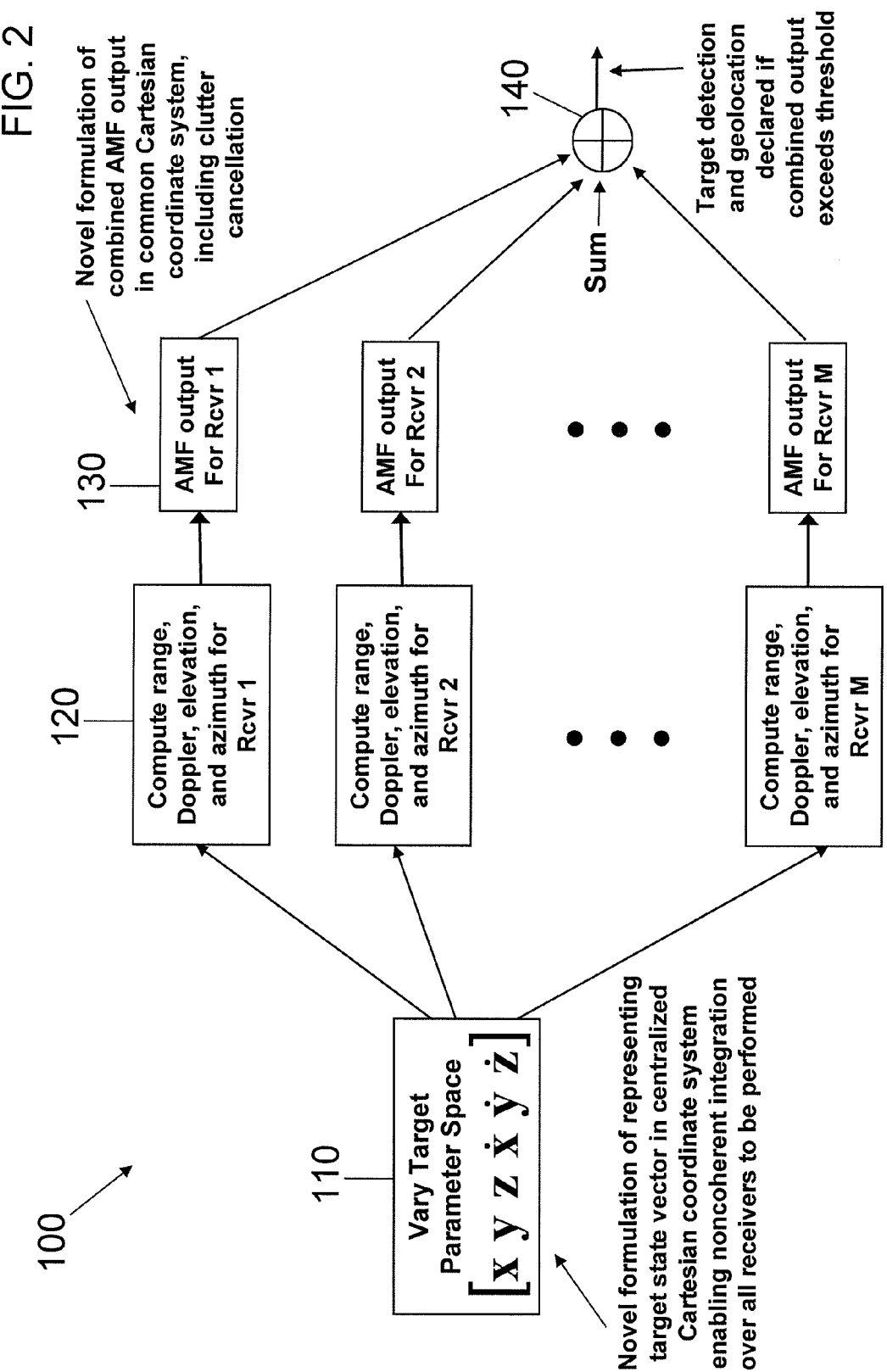
FIG. 2 is a schematic block diagram of a multistatic radar system and method for implementing combined multistatic noncoherent pre-detection fusion processing in accordance with one embodiment of the invention.

FIG. 2 is a schematic block diagram of a multistatic radar system and method 100 for implementing combined multistatic noncoherent pre-detection fusion processing in accordance with one embodiment of the invention.

In FIG. 2, multistatic combined noncoherent processing is performed at a signal processor based on generating and applying the Generalized Likelihood Ratio Test (GLRT) statistic. Here, the complex amplitudes of signals received at the multiple sensors are unknown and are implicitly estimated 110 by the algorithm based on different possible target locations and velocities. For each sensor (receiver) in the system, the signal processor can compute range, Doppler, elevation, and azimuth 120.

The resulting combined GLRT for detecting a target and estimating its position and velocity vectors is $$\max_{x,\dot{x}} J_1(x, \dot{x}) = \sum_{m=1}^{M} \frac{|d_{sm}^H(x, \dot{x}) R_m^{-1} z_m|^2}{d_{sm}^H(x, \dot{x}) R_m^{-1} d_{sm}(x, \dot{x})},$$

where M is the number of receivers; x is the target position (a three-dimensional vector, also expressible as (x,y,z)); $\dot{x}$ is the target velocity (another three-dimensional vector, which can also be expressed as $(\dot{x},\dot{y},\dot{z})$); $d_{sm}(x,\dot{x})$ is the $m^{th}$ receiver signal JN by 1 spatial-temporal steering vector (J is the number of array elements and N is the number of transmit pulses of a multi-pulse radar signal), which is a function of the unknown target position and velocity vectors x and $\dot{x}$ (note that $d_{sm}^H$ is the conjugate transpose of $d_{sm}$); $R_m$ is the clutter plus noise covariance matrix for the $m^{th}$ receiver, which is assumed to be uncorrelated from receiver to receiver; and $z_m$ is the JN by 1 spatial-temporal data vector. It should be noted that this formulation allows the combined noncoherent processing (integration) over all receivers to be performed because the target state vector has been expressed in a common Cartesian coordinate system for all receivers.

In FIG. 2, the adaptive matched filter (AMF) output for the $m^{th}$ receiver is given by $$\frac{|d_{sm}^H(x, \dot{x}) R_m^{-1} z_m|^2}{d_{sm}^H(x, \dot{x}) R_m^{-1} d_{sm}(x, \dot{x})}.$$

For each possible target location and velocity to be simulated, the corresponding AMF outputs are generated 130 for each receiver and summed, thus producing a combined GLRT for detecting a target and estimating its position and velocity vectors. Target detection (or geolocation) can then be declared if the combined sum 140 of the separate AMF outputs exceeds a certain threshold. By using a common Cartesian coordinate system across all receivers, and by using multiple separated receivers to provide different "views" of the target, clutter is effectively canceled out of the above sum, thus detecting and geolocating the target, even when the target is slow moving and in clutter.

Figure 3D:
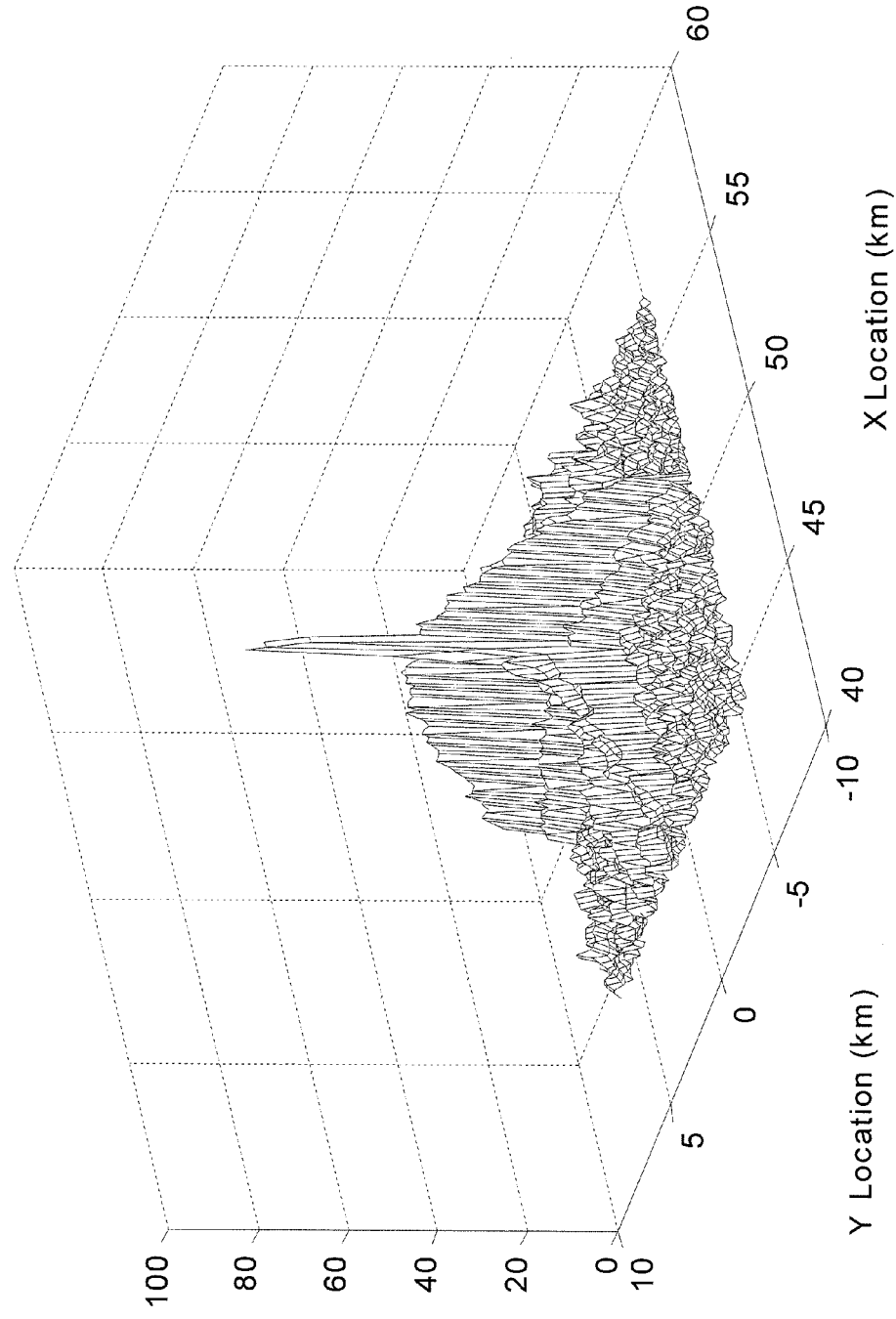
FIG. 3D is a graph of the GLRT statistic versus target Cartesian position (x, y) for the first, second, and third receivers combined in the multistatic radar system of FIGS. 3A-3C.

FIGS. 3A-3D illustrate the noncoherent multistatic GLRT technique with some actual data from an exemplary embodiment of the present invention. FIG. 3A is a graph of the generalized likelihood ratio test (GLRT) statistic versus Cartesian position (x, y) for a first receiver (Receiver 1) in a multistatic radar system in accordance with one embodiment of the invention. Likewise, FIG. 3B is a graph of the GLRT statistic versus Cartesian position (x, y) for a second receiver (Receiver 2) and FIG. 3C is a graph of the GLRT statistic versus Cartesian position (x, y) for a third receiver (Receiver 3) in the multistatic radar system used in FIG. 3A. FIG. 3D is a graph of the GLRT statistic versus Cartesian position (x, y) for the first, second, and third receivers combined in accordance with the embodiment of FIGS. 3A-3C. Each of FIGS. 3A-3D shows a three-dimensional plot, with x and y Cartesian coordinates for the x- and y-axes, and with the GLRT statistic (AMF output) displayed on the z-axis. It should be noted that the z Cartesian coordinate is omitted for ease of illustration. In addition, the velocity data is held constant at the true velocity (in this case, −6.4 meters per second (mps) in the x direction and 7.7 mps in the y direction) for the data presented in FIGS. 3A-3D.

Referring to FIGS. 3A-3C, each of Receivers 1, 2, and 3 provides a somewhat localized perspective on the true location of the target, tending to favor a particular line in the X-Y plane, with only a slight preference for the actual target location. Combining the three results, as shown in FIG. 3D, shows a decided preference for the actual target location (in this case, 50.0 kilometers (km) in the x direction and 0.0 kilometers in the y direction).

Figure 4A:
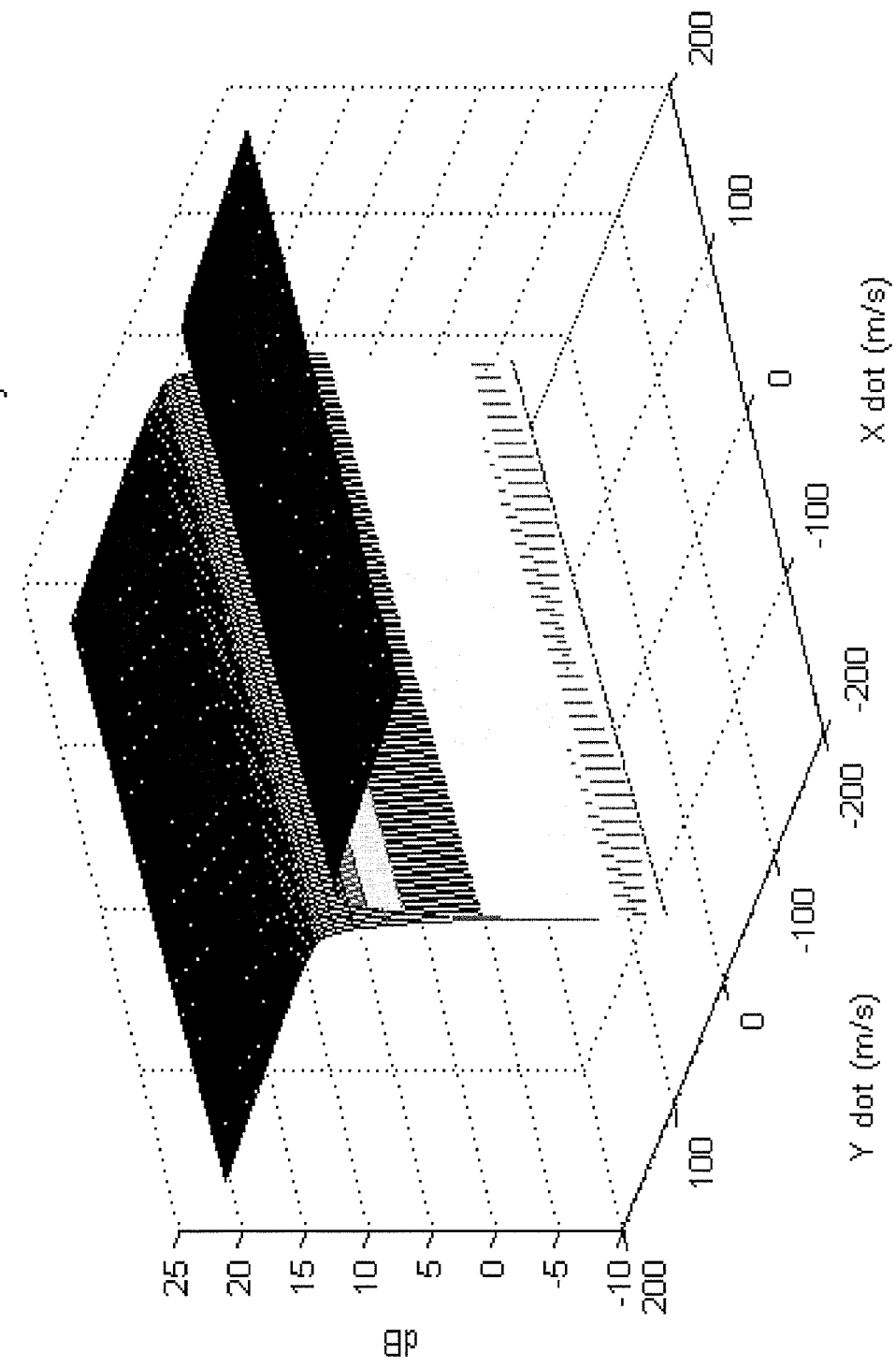
FIG. 4A is a graph of the space-time adaptive processing (STAP) signal-to-interference-plus-noise ratio (SINR) versus an X-Y target velocity (Cartesian velocity ($\dot{x}$, $\dot{y}$)) for the first receiver (Receiver 1) in a multistatic radar system in accordance with one embodiment of the invention.
Figure 4B:
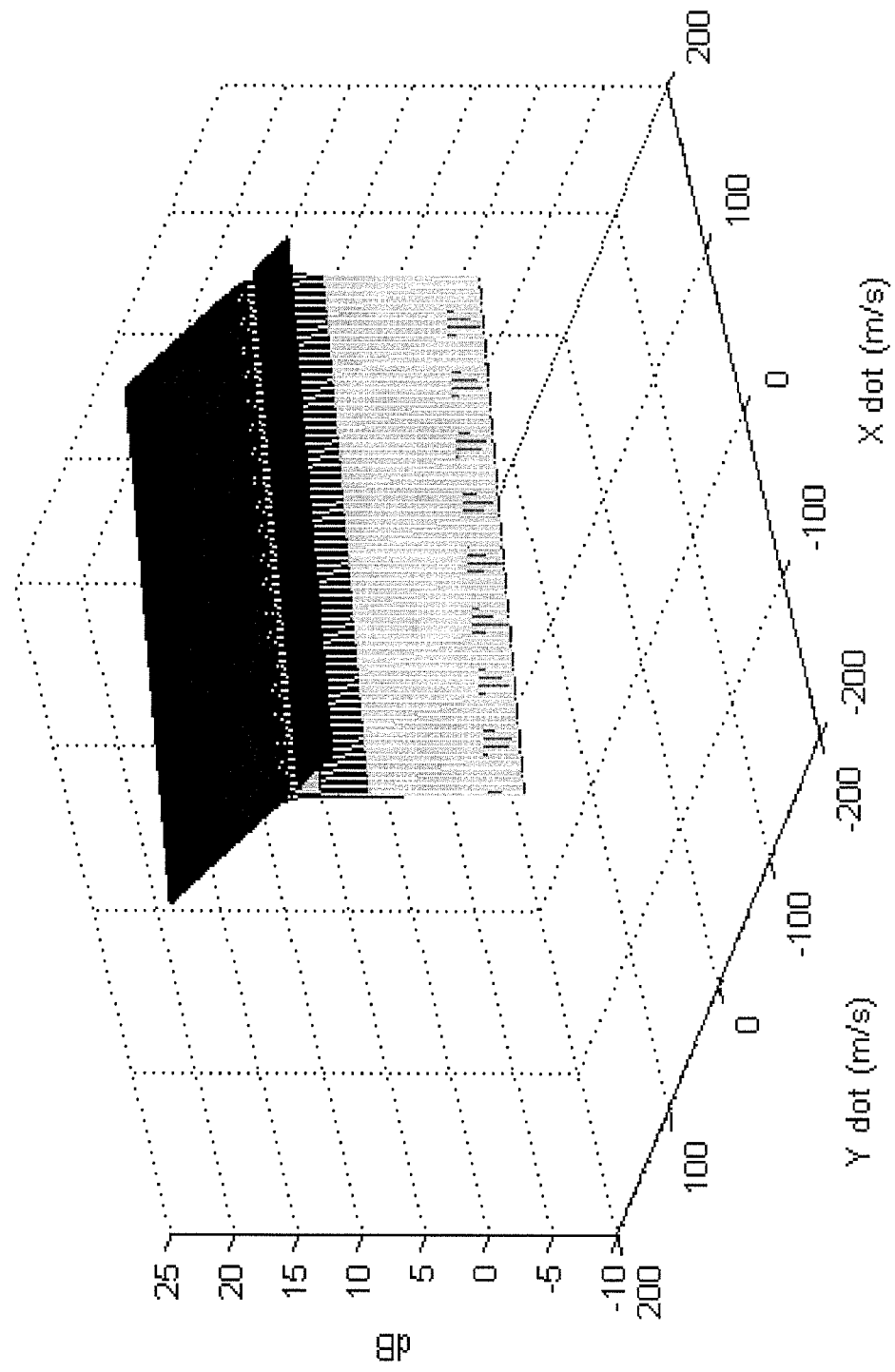
FIG. 4B is a graph of the STAP SINR versus target Cartesian velocity ($\dot{x}$, $\dot{y}$) for the second receiver (Receiver 2) in the multistatic radar system used in FIG. 4A.
Figure 4C:
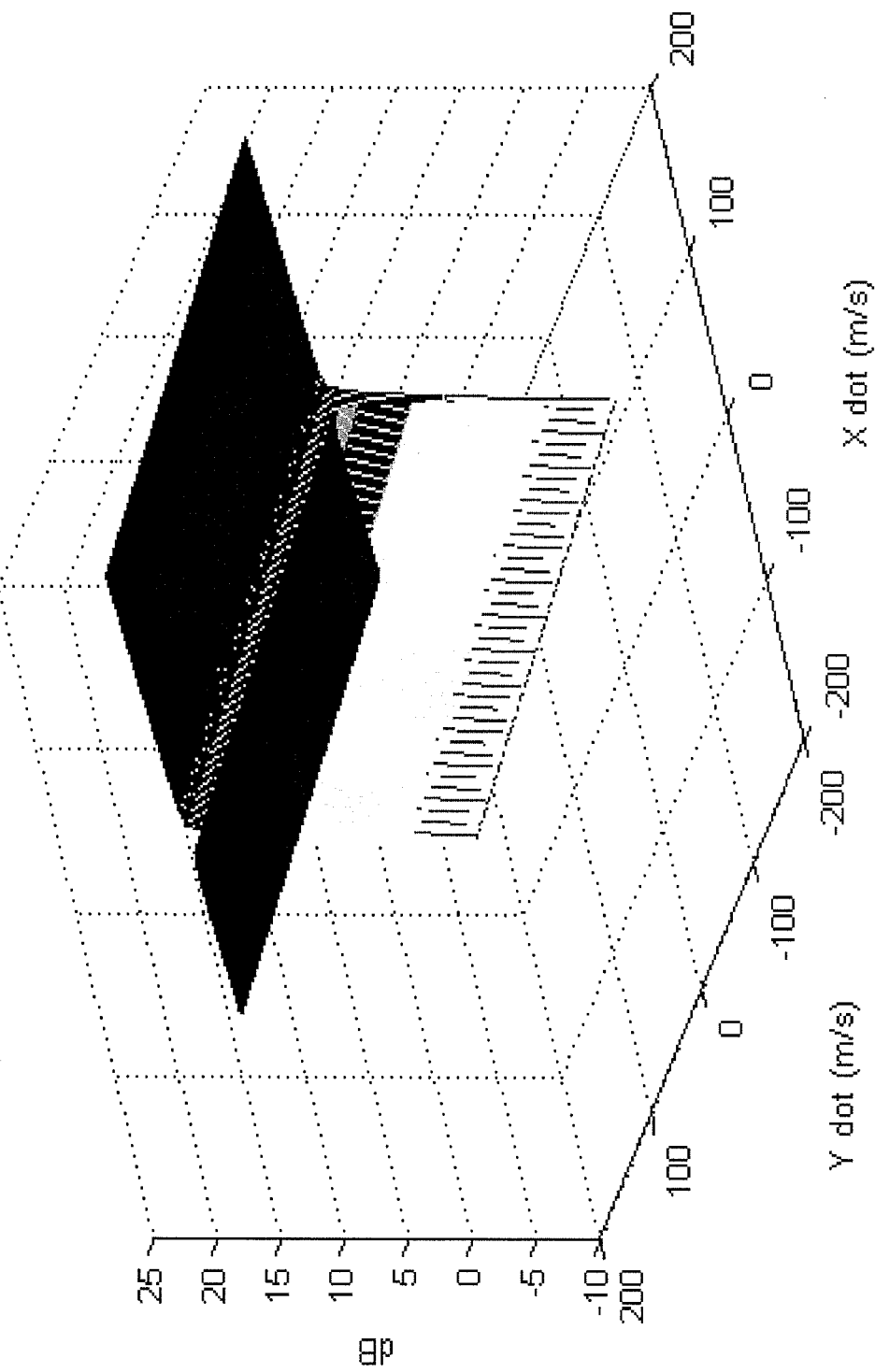
FIG. 4C is a graph of the STAP SINR versus target Cartesian velocity ($\dot{x}$, $\dot{y}$) for the third receiver (Receiver 3) in the multistatic radar system used in FIG. 4A.
Figure 4D:
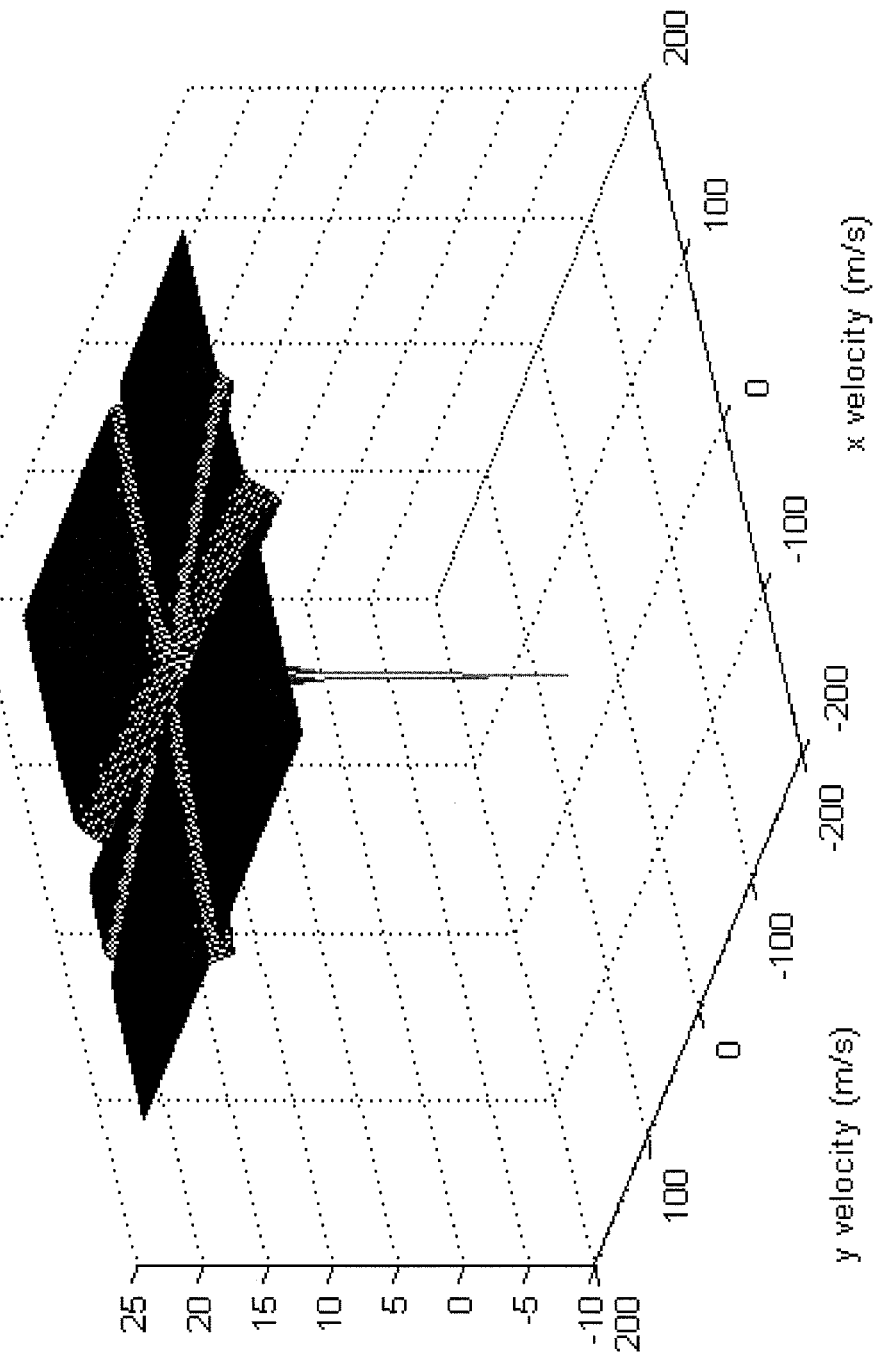
FIG. 4D is a graph of the STAP SINR versus target Cartesian velocity ($\dot{x}$, $\dot{y}$) for the first, second, and third receivers combined in the multistatic radar system of FIGS. 4A-4C.

FIGS. 4A-4D illustrate another application of the technique, only this time modeling target velocity in an exemplary embodiment according to the present invention. FIG. 4A is a graph of the space-time adaptive processing (STAP) signal-to-interference-plus-noise ratio (SINR) versus an X-Y target velocity (Cartesian velocity ($\dot{x}$, $\dot{y}$)) for the first receiver (Receiver 1) in a multistatic radar system using the above GLRT technique in accordance with one embodiment of the invention. Likewise, FIG. 4B is a graph of the STAP SINR versus target Cartesian velocity ($\dot{x}$, $\dot{y}$) for the second receiver (Receiver 2) and FIG. 4C is a graph of the STAP SINR versus target Cartesian velocity ($\dot{x}$, $\dot{y}$) for the third receiver (Receiver 3) in the multistatic radar system used in FIG. 4A. Finally, FIG. 4D is a graph of the STAP SINR versus target Cartesian velocity ($\dot{x}$, $\dot{y}$) for the first, second, and third receivers combined in accordance with the embodiment of FIGS. 4A-4C. Each of these figures shows a three-dimensional plot, with x and y Cartesian velocity coordinates for the x- and y-axes, and the GLRT statistic (AMF output) of SINR (in decibels (dB)) is displayed on the z-axis. It should be noted that the z Cartesian velocity coordinate is omitted for ease of illustration. Further, the target position data is held constant at the true position for the data presented in FIGS. 4A-4D.

Referring to FIGS. 4A-4C, each of Receivers 1, 2, and 3 provides a somewhat localized perspective on the true velocity of the target, tending to favor a particular line in the X velocity-Y velocity plane. However, as can be seen in FIGS. 4A-4D, the combined STAP SINR obtained by GLRT (FIG. 4D) shows substantial reduction of trough in the X velocity-Y velocity plane compared to individual STAP SINR (FIGS. 4A-4C), and lowering of minimum detectable velocity to virtually zero.

Coherent Multistatic GLRT Statistic

The coherent generalized likelihood ratio test (GLRT), based on modeling the target return signal phase and magnitude in the receivers and then combining the resulting signals in a technique similar to that discussed above for the noncoherent GLRT technique, is presented here. The coherent GLRT technique is premised on the target signal phase and magnitude received at the different receivers being a function of the (unknown) path length difference between the $m^{th}$ receiver relative to the (arbitrary) first receiver. Arbitrarily choosing one of the receivers as the first (reference) receiver, the radar return signal complex amplitude for the $m^{th}$ receiver first pulse relative to the first receiver can be represented by a complex gain value $$g_m(x) = \frac{r_1(x)}{r_m(x)} e^{-j2\pi r_{m1}(x)/\lambda}$$

where $r_m(x)$ is the distance of the $m^{th}$ receiver from the target whose position vector is denoted by x; $r_{m1}(x) = r_m(x) - r_1(x)$ is the path length difference between the target and the $m^{th}$ receiver, and the target and the first receiver; and $g_1 = 1$.

The first pulse complex signal amplitude received at the $m^{th}$ receiver is then $g_m a_s$, where $a_s$ is the complex signal amplitude at the first receiver. Note that $g_m(x)$ is a function of the unknown target position vector x. The coherent GLRT statistic can now be derived in the usual manner by defining a modified concatenated spatial-temporal steering vector for the M receivers using the complex gains $g_m(x)$ as follows:

$$\underline{d}_{sg}(\underline{x},\underline{\dot{x}})=[g_1(\underline{x})\underline{d}_{s1}^T(\underline{x},\underline{\dot{x}})g_2(\underline{x})\underline{d}_{s2}^T(\underline{x},\underline{\dot{x}})\ldots g_M(\underline{x})\underline{d}_{sM}^T(\underline{x},\underline{\dot{x}})]^T,$$

where $\underline{d}_{sm}(\underline{x},\underline{\dot{x}})$, m=1, 2, . . . , M, are the standard spatial-temporal steering vectors.

Under the assumption that the clutter observed in the M receivers is uncorrelated, the coherent GLRT statistic for detecting the target return can then be shown (see, for example, J. R. Guerci, *Space-Time Adaptive Processing for Radar*, ARTECH House, 2003) to be the following by using the above modified spatial-temporal steering vector in the well-known form for the adaptive matched filter (AMF) test statistic:
Compute $$\max_{\underline{x},\underline{\dot{x}}} J_{coh} = \frac{\left|\sum_{m=1}^{M} g_m^*(\underline{x}) d_{sm}^H(\underline{x},\underline{\dot{x}}) R_m^{-1} z_m\right|^2}{\sum_{m=1}^{M} |g_m(\underline{x})|^2 d_{sm}^H(\underline{x},\underline{\dot{x}}) R_m^{-1} d_{sm}(\underline{x},\underline{\dot{x}})},$$

where $g^*_m(\underline{x})$ is the conjugate transpose of $g_m(\underline{x})$, $R_m$ is the interference plus noise covariance matrix of the $m^{th}$ receiver, $z_m$ is the JN by 1 spatial-temporal data vector (J is the number of array elements and N is the number of transmit pulses of a multi-pulse radar signal), and any other symbols are as defined previously. A detection is declared if this maximum exceeds a threshold (for example, a pre-set threshold) and the corresponding x, ẋ are the maximum-likelihood estimators of the target position and velocity vectors, respectively.

It should be noted that this parameter estimation based multistatic coherent GLRT statistic has been derived under the assumption that the target signal is coherent across the M receivers, except that it has undergone a target-position-dependent phase change and amplitude attenuation only. In addition, the bistatic target radar cross-section is assumed to be constant in all directions, which is approximately true for small bistatic angles.

FIGS. 5-8 illustrate the coherent GLRT statistic technique with some actual data.

Figure 5:
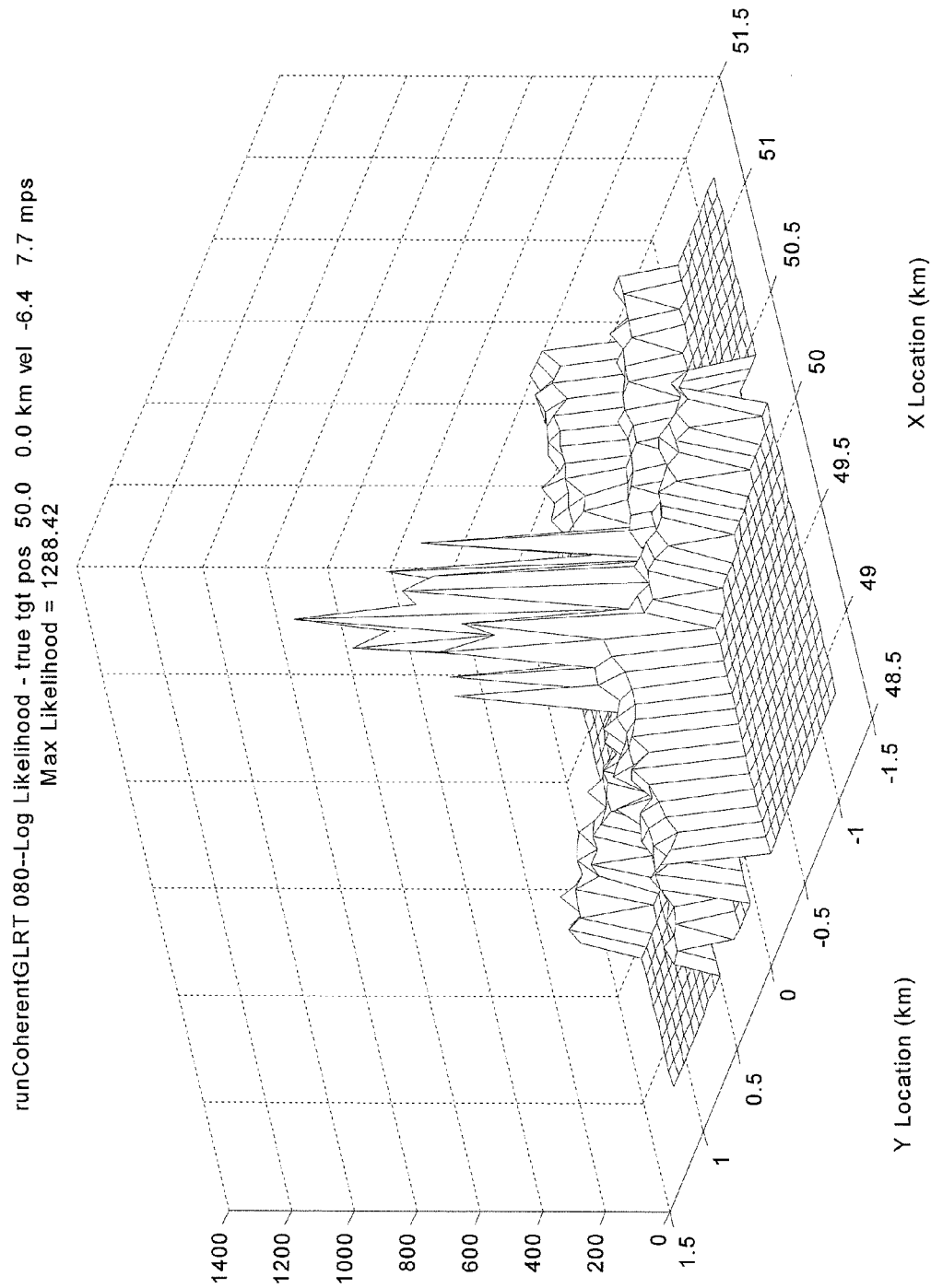
FIG. 5 is a three-dimensional plot of a coherent generalized likelihood ratio (GLR) versus target Cartesian position (x, y) for a multistatic radar system in accordance with one embodiment of the invention.
Figure 6:
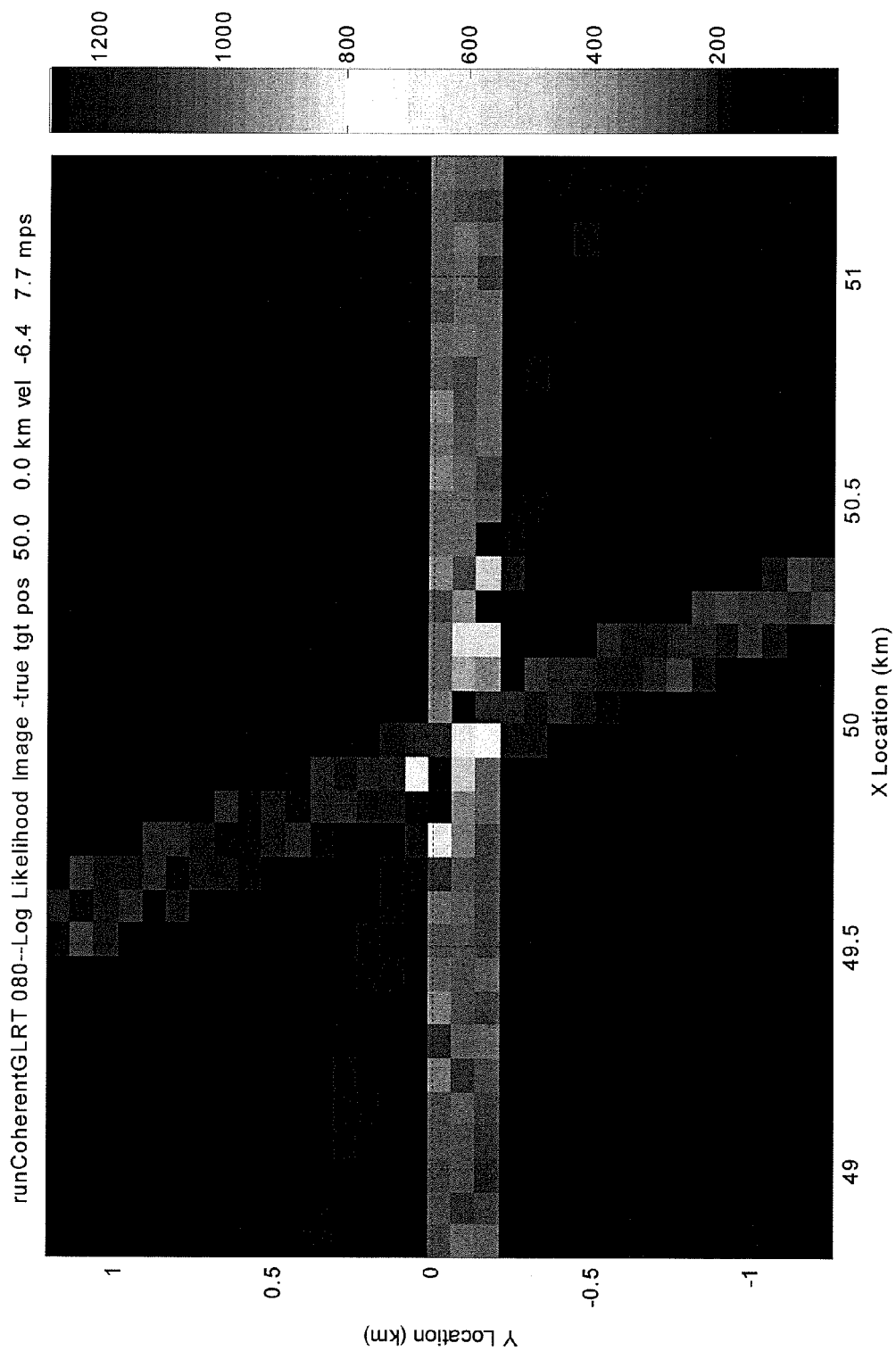
FIG. 6 is a top view of the plot of FIG. 5.
Figure 7:
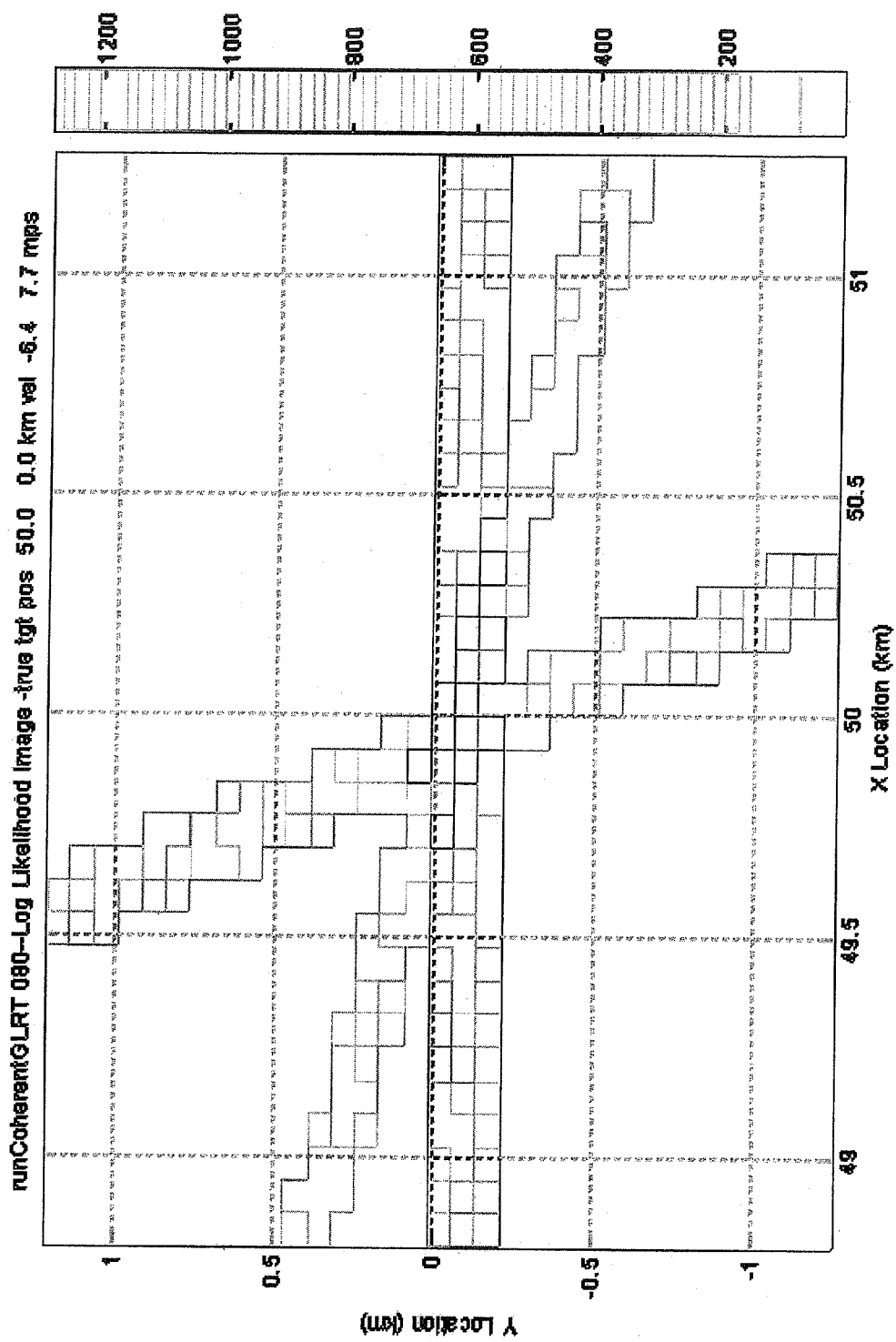
FIG. 7 is a line drawing of the top view of the plot of FIG. 5.

FIG. 5 is a three-dimensional plot of a coherent generalized likelihood ratio (GLR) versus target Cartesian position (x, y) for a multistatic radar system in accordance with one embodiment of the invention. FIG. 6 is a top view of the plot of FIG. 5. FIG. 7 is a line drawing of the top view of the plot of FIG. 5. FIG. 5 shows a three-dimensional plot, with x and y Cartesian velocity coordinates for the x- and y-axes, and the coherent GLRT statistic for the z-axis. It should be noted that the z Cartesian velocity coordinate is omitted for ease of illustration. Further, the velocity data is held constant at the true velocity (in this case, −6.4 meters per second (mps) in the x direction and 7.7 mps in the y direction) for the data presented in FIGS. 5-7. As can be seen, the coherent GLRT statistic exhibits behavior similar to the noncoherent GLRT statistic (as illustrated in FIGS. 3A-3D), reaching a maximum value of 1288.42 at the true target position (in this case, 50.0 km in the x direction and 0.0 km in the y direction).

Figure 8:
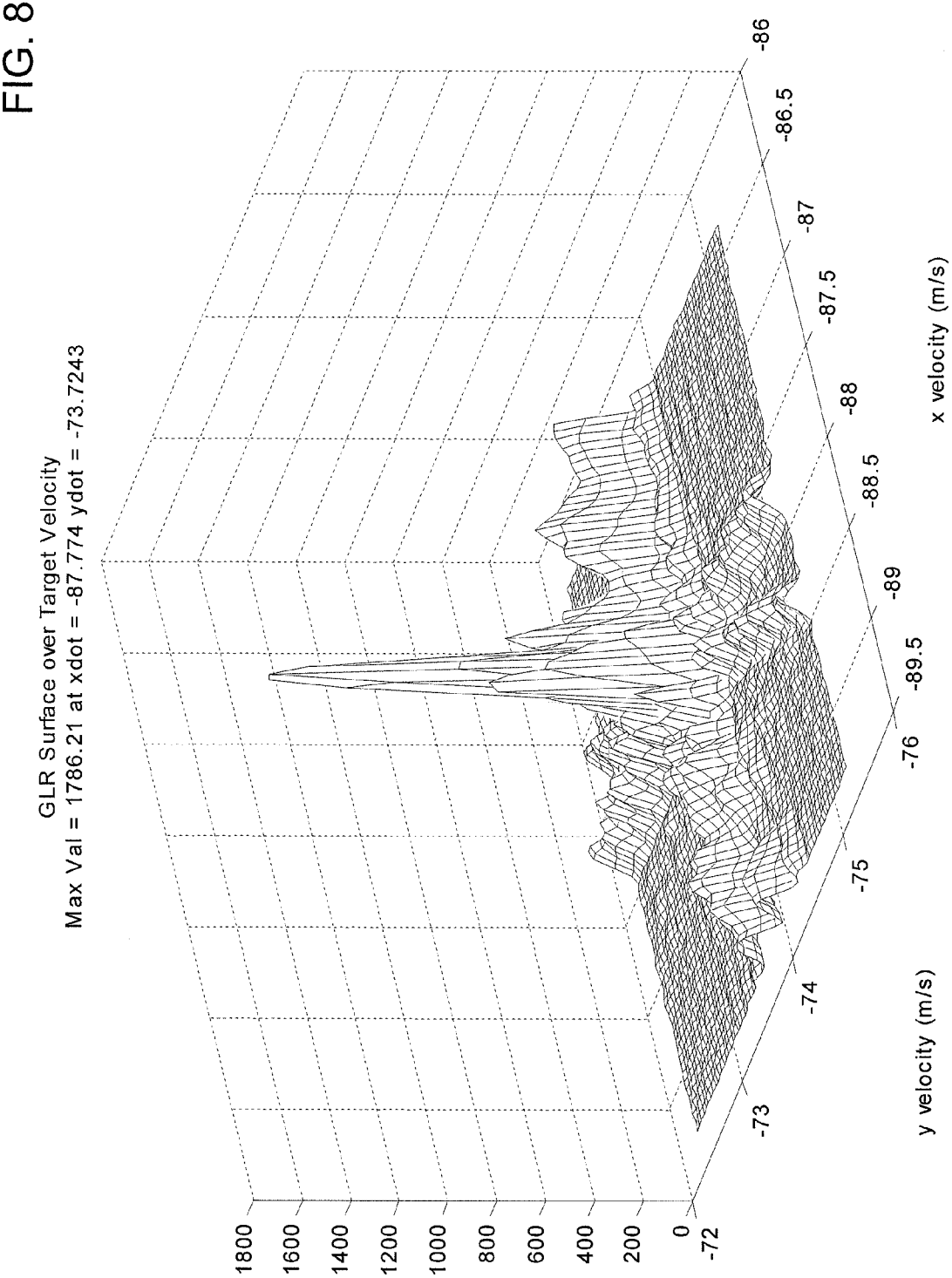
FIG. 8 is a three-dimensional plot of a coherent generalized likelihood ratio (GLR) versus target Cartesian velocity ($\dot{x}$, $\dot{y}$) for a multistatic radar system in accordance with one embodiment of the invention.

FIG. 8 is a three-dimensional plot of a coherent generalized likelihood ratio (GLR) versus target Cartesian velocity (ẋ, ẏ) for a multistatic radar system in accordance with one embodiment of the invention. It should be noted that the z Cartesian velocity coordinate is omitted for ease of illustration. Further, the position data is held constant at the true position for the data presented in FIG. 8. As can be seen, the coherent GLRT statistic as illustrated for hypothetical target velocity in FIG. 8 exhibits similar behavior to that of the coherent GLRT statistic as illustrated for hypothetical target position in FIGS. 5-7. In FIG. 8, the GLRT statistic has a maximum value (in this case, 1786.21) at the true velocity of −87.774 mps in the x direction and −73.7243 mps in the y direction.

Coherent Multistatic MVDR Test

The minimum variance distortionless response (MVDR) method is well known for the single receiver case. See, for example, S. Haykin, *Adaptive Filter Theory*, $3^{rd}$ Edition, Prentice-Hall, 1996.

For the multistatic model with unknown parameters, by using the modified form of the steering vector given above, the multistatic coherent MVDR test statistic can be shown to be the following:

$$J_{MVDR}(\underline{x},\underline{\dot{x}}) = \frac{1}{\sum_{m=1}^{M} |g_m(\underline{x})|^2 \underline{d}_{sm}^H(\underline{x},\underline{\dot{x}}) R_m^{-1} \underline{d}_{sm}(\underline{x},\underline{\dot{x}})},$$

where the variables and symbols are as defined previously. Note that the covariance matrix $R_m$ also includes the signal rank 1 matrix if the search position vector x maps to the target bistatic range cell for the $m^{th}$ receiver.

Computer Simulation Results

FIGS. 9-16 illustrate some computer simulation results for the coherent GLRT (FIGS. 10-12) and coherent MVDR (FIGS. 13-16) techniques.

Figure 9:
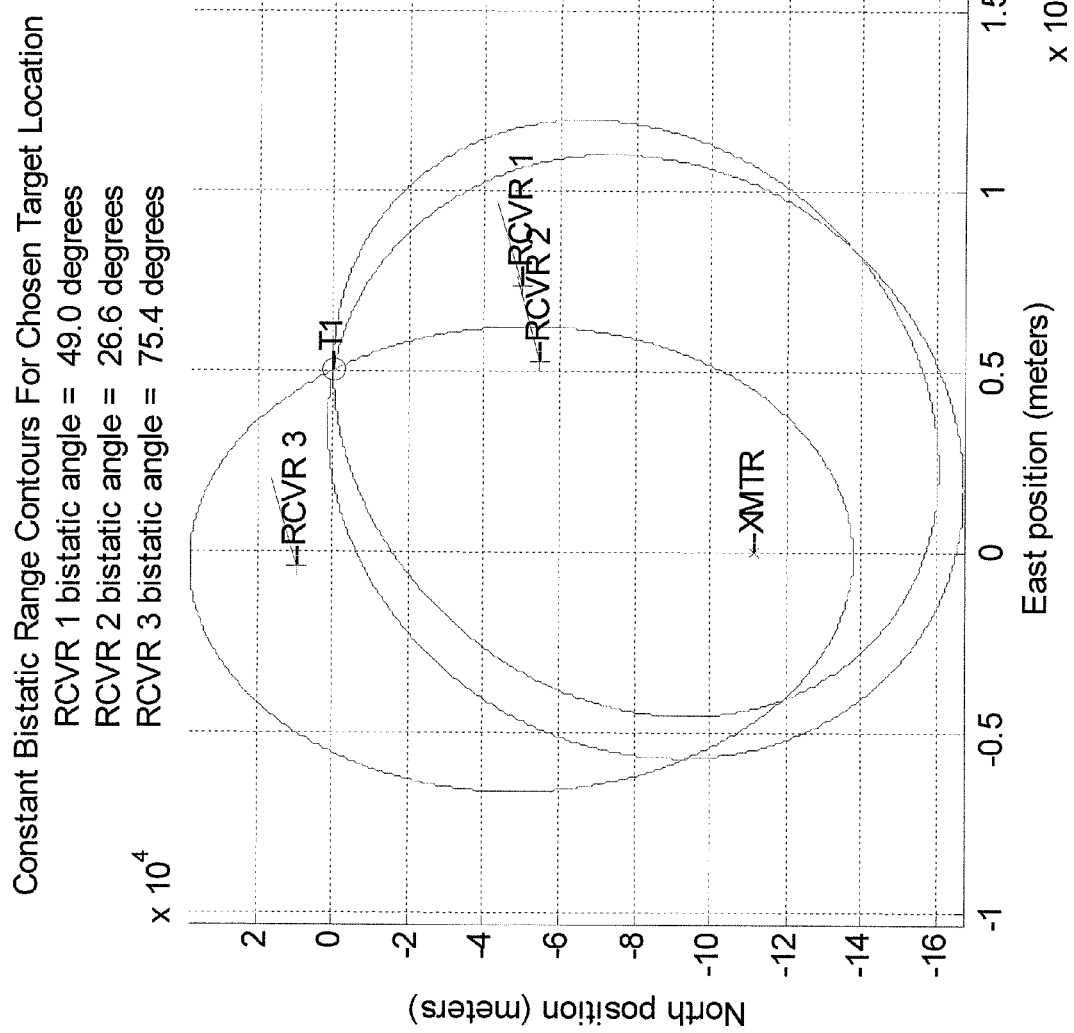
FIG. 9 is a two-dimensional depiction of an exemplary overall radar scenario (multistatic geometry) including one transmitter and three separated receivers together with their corresponding iso-range ellipses to a target in accordance with one embodiment of the invention.

FIG. 9 is a two-dimensional depiction of an exemplary overall radar scenario (multistatic geometry) including one transmitter and three separated receivers together with their corresponding iso-range ellipses to a target in accordance with one embodiment of the invention. The iso-range ellipses are with respect to the combined range of the transmitter to the target and back to the corresponding receiver. While only two dimensions (north and east) are shown for ease of illustration, altitude (especially of the individual receivers) also plays a role in the combined range from the transmitter to the target and back to the receiver. The ellipses intersect at the point corresponding to the target. The corresponding bistatic angles (that is, the angle between the three points denoted by the transmitter, the target, and the respective receiver) are also shown. The relatively large differences in the bistatic angles (roughly 25° or 50° between different receivers) provides good coverage of the target from different "views."

Coherent GLRT Simulation Results

Figure 10:
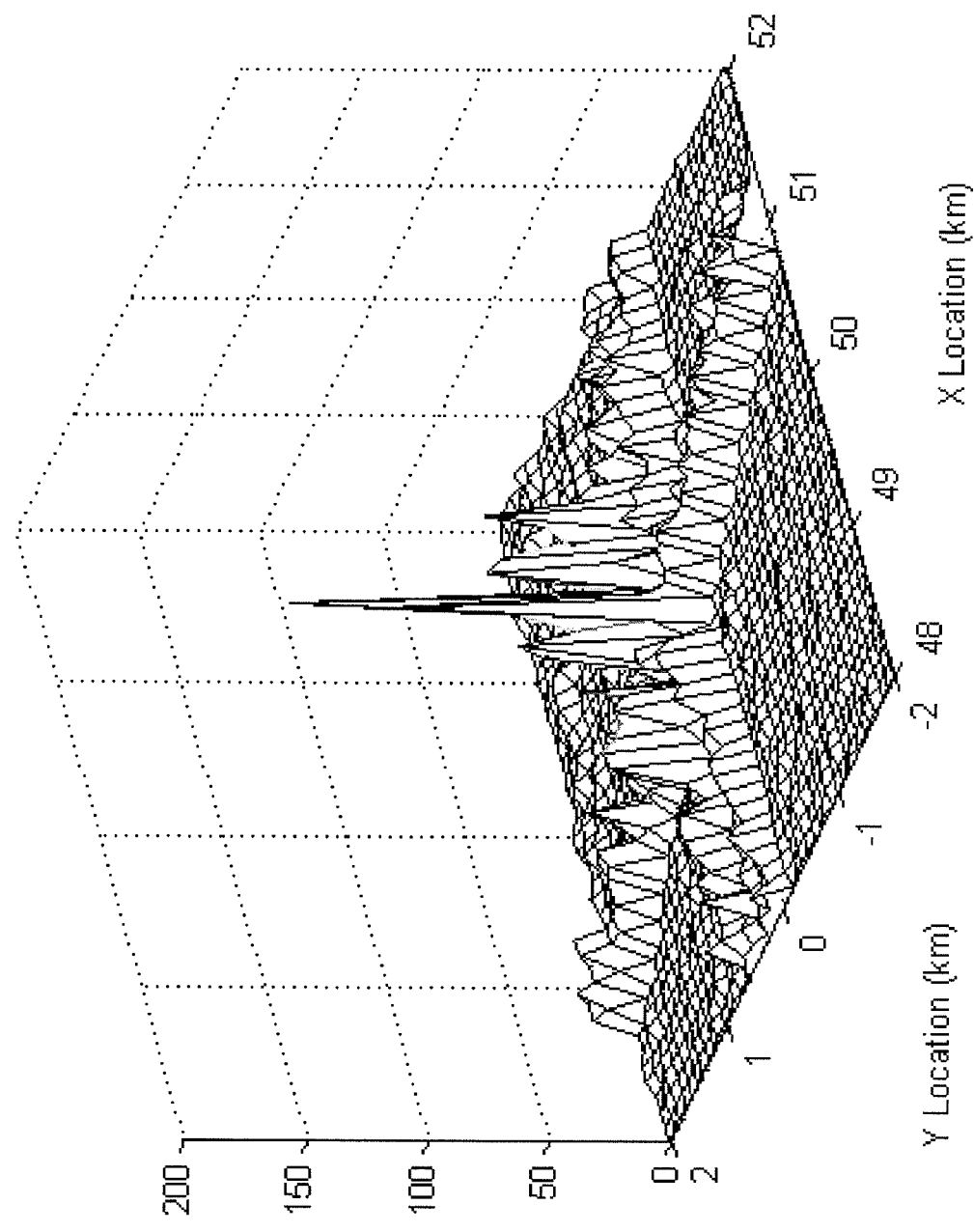
FIG. 10 is a three-dimensional plot illustrating the corresponding combined coherent generalized likelihood ratio (GLR) versus target Cartesian position (x, y) in a 4 km by 4 km area for the three receivers of FIG. 9.
Figure 11:
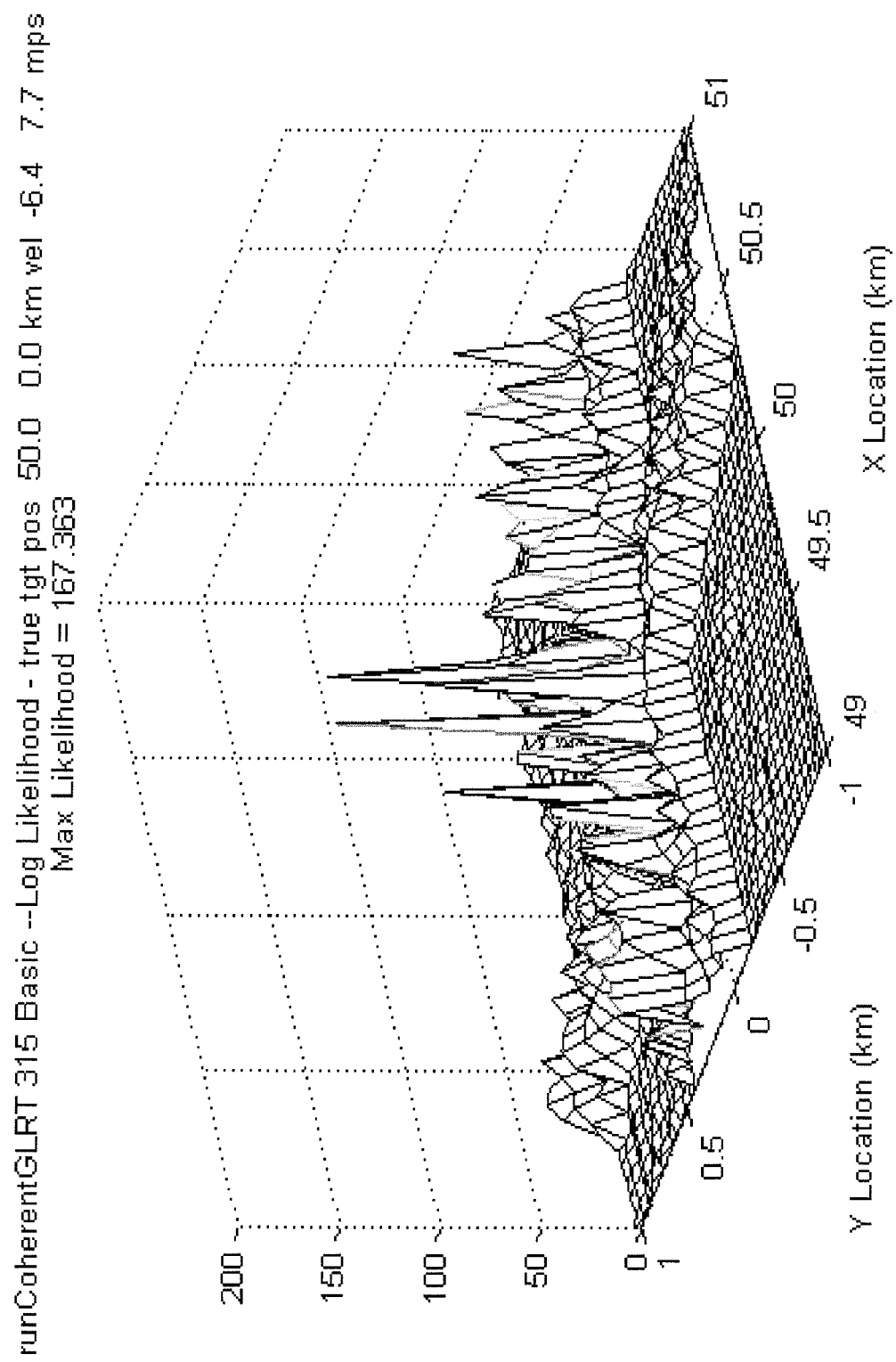
FIG. 11 is a three-dimensional plot illustrating the combined GLR versus target Cartesian position (x, y) in a 2 km by 2 km area for the three receivers of FIG. 9.

FIG. 10 is a three-dimensional plot illustrating the corresponding combined coherent generalized likelihood ratio (GLR) versus target Cartesian position (x, y) in a 4 km by 4 km area for the three receivers of FIG. 9. The data is presented in similar format to that of FIG. 5, as described above. The peak occurs near the true target location. For ease of illustration, the velocity is assumed to be the true velocity for FIG. 10.

Figure 12:
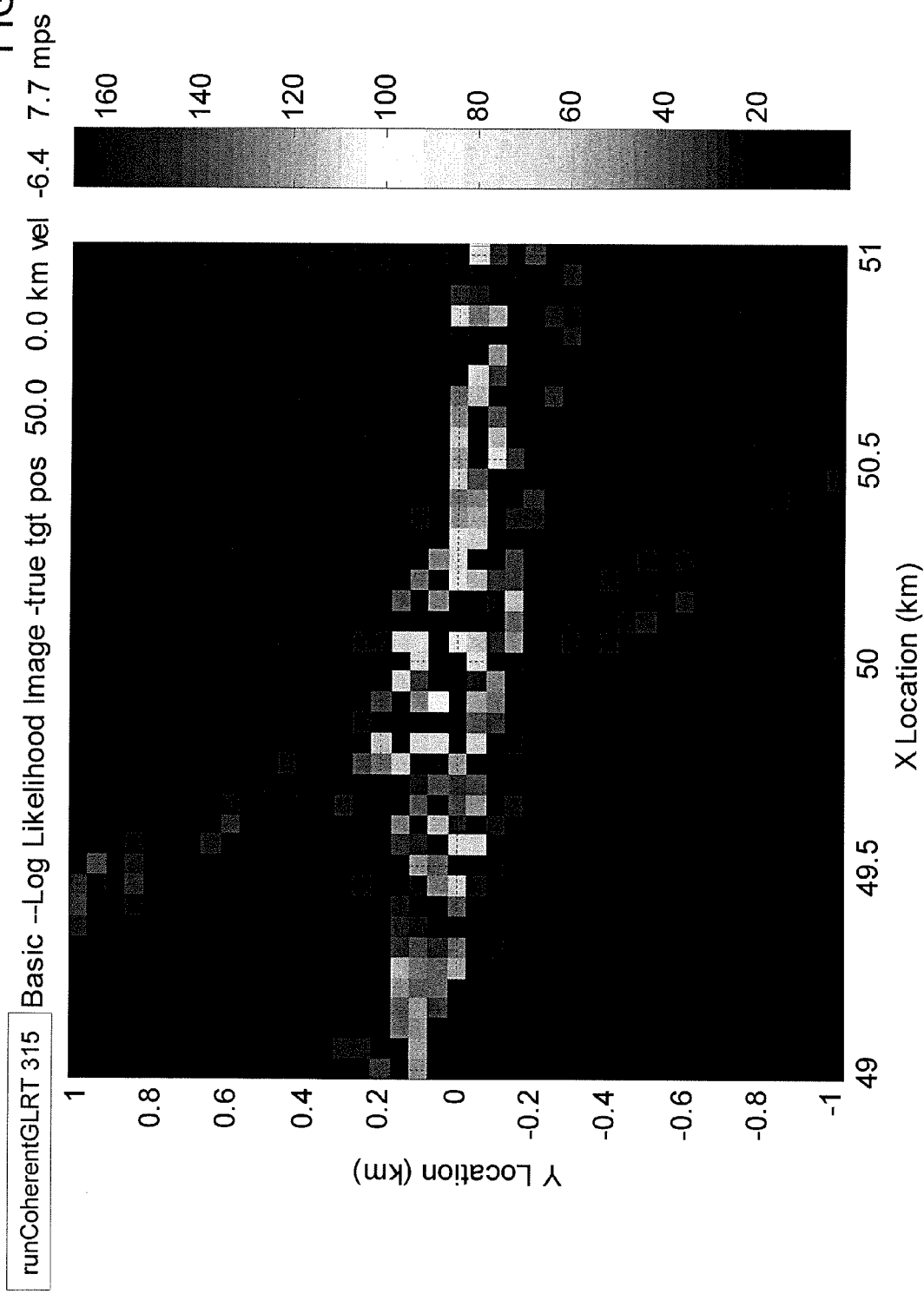
FIG. 12 is a top view of the plot of FIG. 11.

Computing the GLR using a finer resolution in the (x, y) coordinates reveals ambiguous peaks occurring in a periodic manner, which is due to the estimation error of the range differences to the receivers from the target being an integer multiple of the wavelength. See, for example, FIG. 11, which shows the same plot as FIG. 10, only resolved down to the central 2 km by 2 km portion. FIG. 12 is a top view of the plot of FIG. 11

In more detail, on the smaller scale and finer resolution depictions of the GLRT statistic, the combined coherent GLRT reveals the presence of additional peaks near the true target location in (x, y). This is due to the variation in x that can result in the phase term in $g_m(x)$ changing by multiples of $2\pi$ for all m, thereby rendering the GLR function constant. Zooming in on the target location (by plotting the combined GLR at finer sample resolution over a smaller area) reveals even more complex behavior, which show a succession of smaller areas around the target location. As the level of detail shown in these figures increases, more and more peaks become visible, and in the smallest (where each square represents a 1 m by 1 m area), a regular array of ambiguous peaks appears. Note that these ambiguous peaks tend to diminish in number and become more attenuated if the number of receivers and the spatial diversity of the receivers increases.

Coherent MVDR Simulation Results

Figure 13:
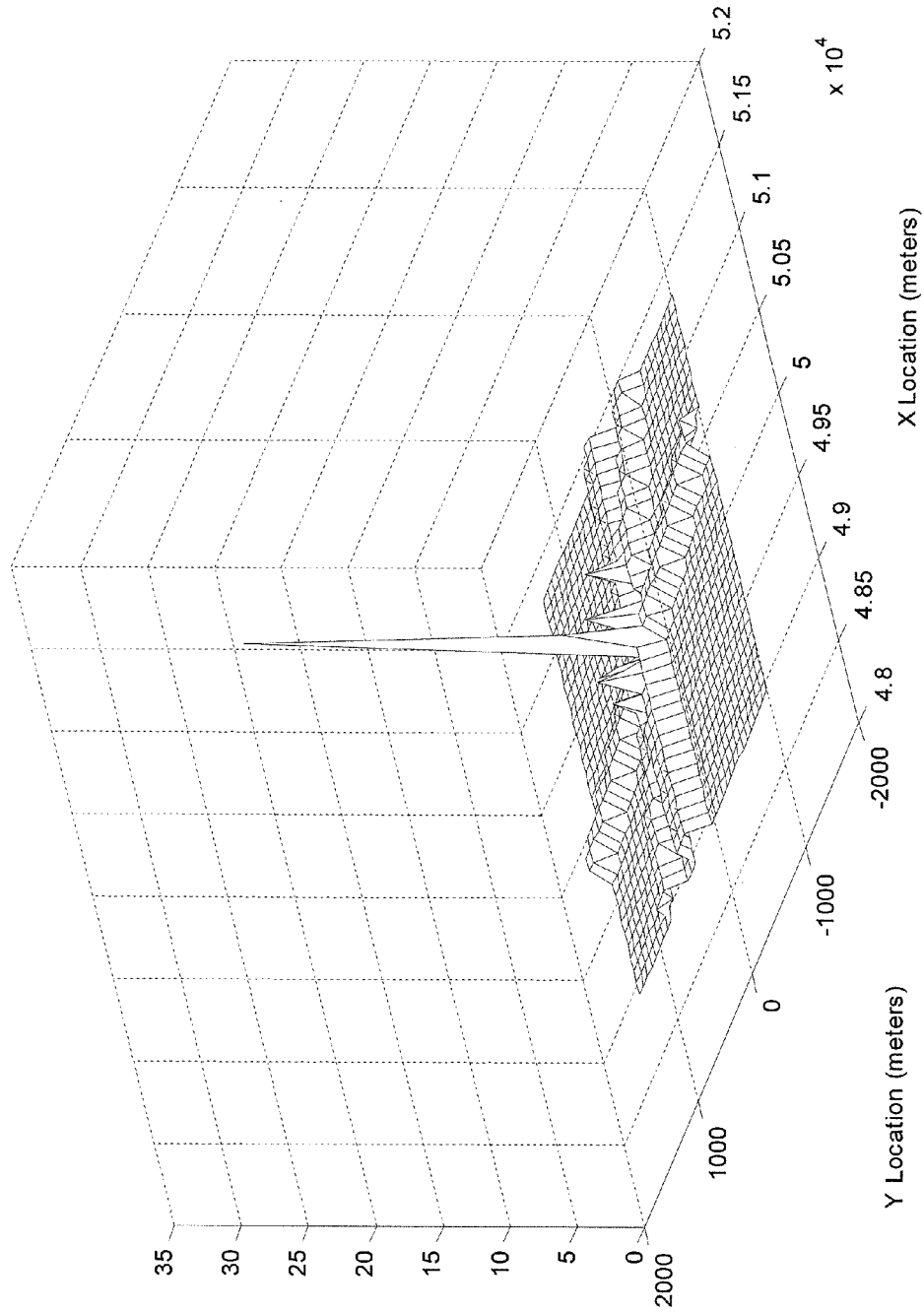
FIG. 13 is a three-dimensional plot illustrating the combined coherent minimum variance distortionless response (MVDR) target Cartesian position (x, y) in a 4 km by 4 km grid for the three receivers of FIG. 9.
Figure 14:
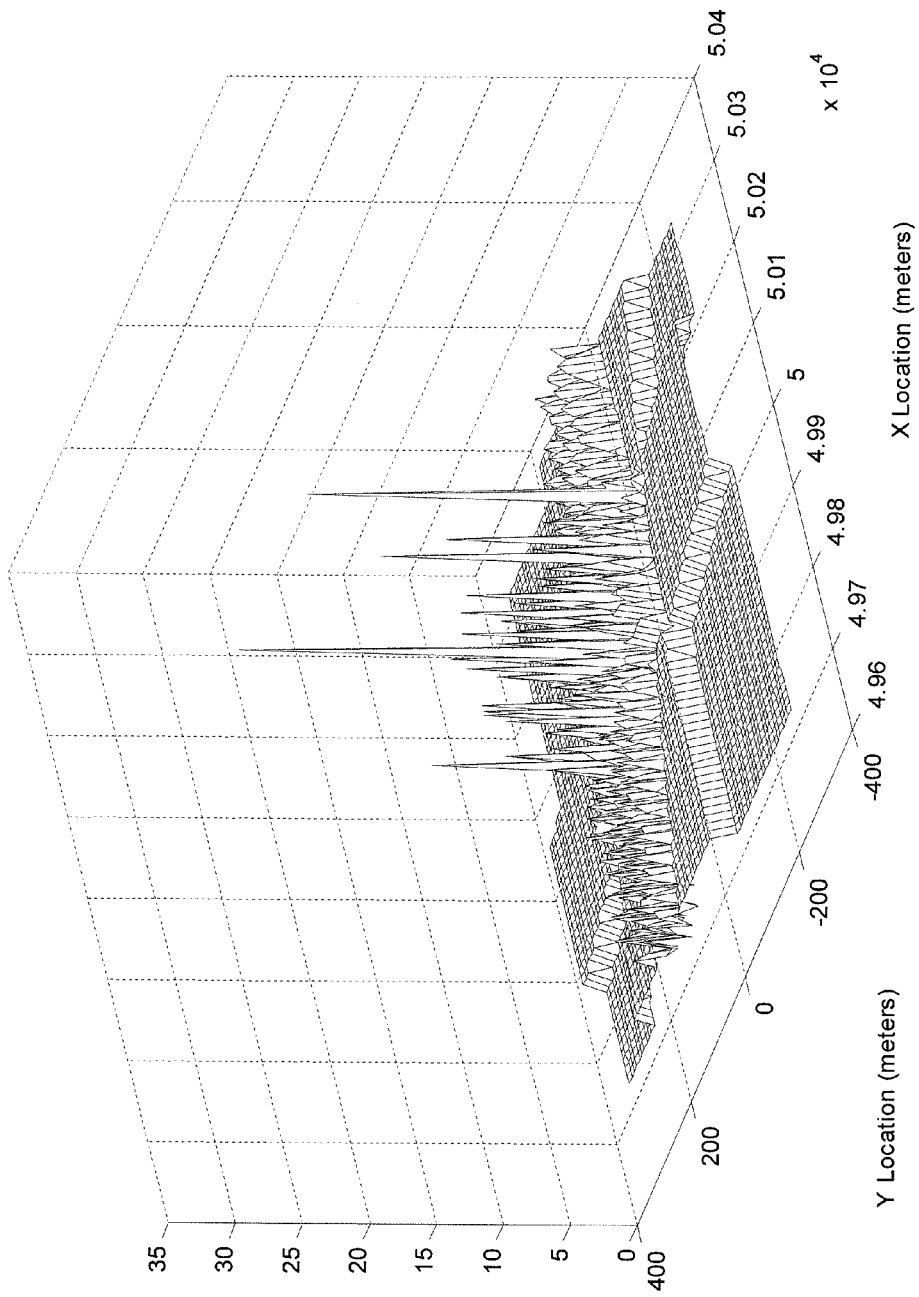
FIG. 14 is a three-dimensional plot illustrating the combined coherent MVDR target Cartesian position (x, y) in an 800 m by 800 m grid (finer resolution) of the central portion of FIG. 13.
Figure 15:
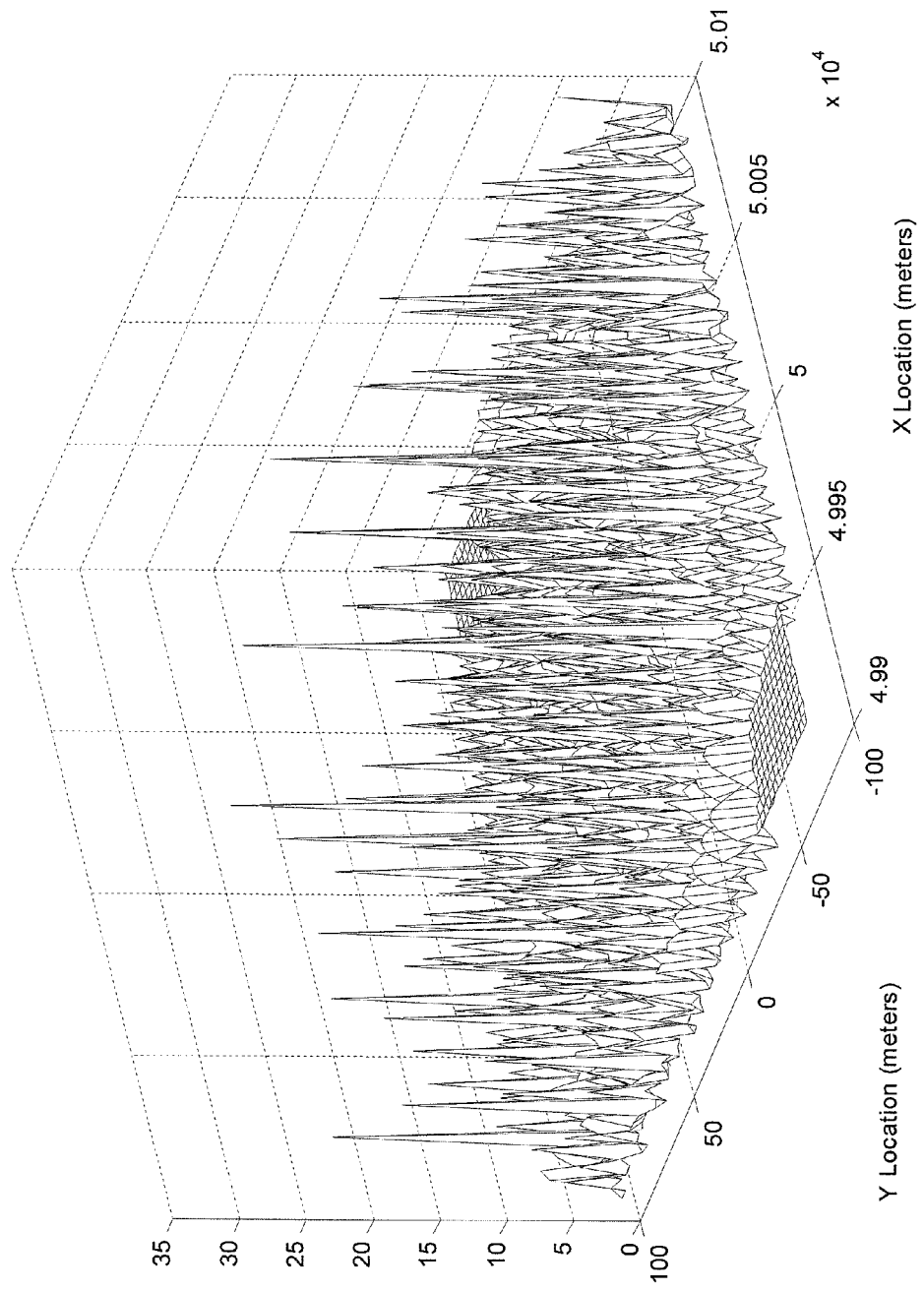
FIG. 15 is a three-dimensional plot illustrating the combined coherent MVDR target Cartesian position (x, y) in a 200 m by 200 m grid (still finer resolution, 3 m grid spacing) of the central portion of FIG. 13.

FIG. 13 is a three-dimensional plot illustrating the combined coherent minimum variance distortionless response (MVDR) target Cartesian position (x, y) in a 4 km by 4 km grid for the three receivers of FIG. 9. FIG. 14 is a 800 m by 800 m grid (finer resolution) of the central portion of FIG. 13, while FIG. 15 is a 200 m by 200 m grid (still finer resolution, 3 m grid spacing) of the central portion of FIG. 13. For ease of illustration, FIG. 13 shows the MVDR statistic as a function of hypothetical x-y target location, with the hypothetical z location component and target velocity fixed at the true values.

In FIG. 13, the data is plotted as a three-dimensional surface. These results are for the three-receiver embodiment shown in FIG. 9. These results appear generally quite similar to the coherent GLRT results (see FIGS. 10-12). The coarse 75 m resolution plots show three ridges (corresponding to constant bi-static range loci with respect to each of the receivers) with a strong peak at the common intersection point of these loci. Zooming in on this peak at progressively finer resolutions (see FIGS. 14-15) reveals a complex structure of multiple ambiguous sub-peaks, just as occurred with the coherent GLRT technique.

Figure 16:
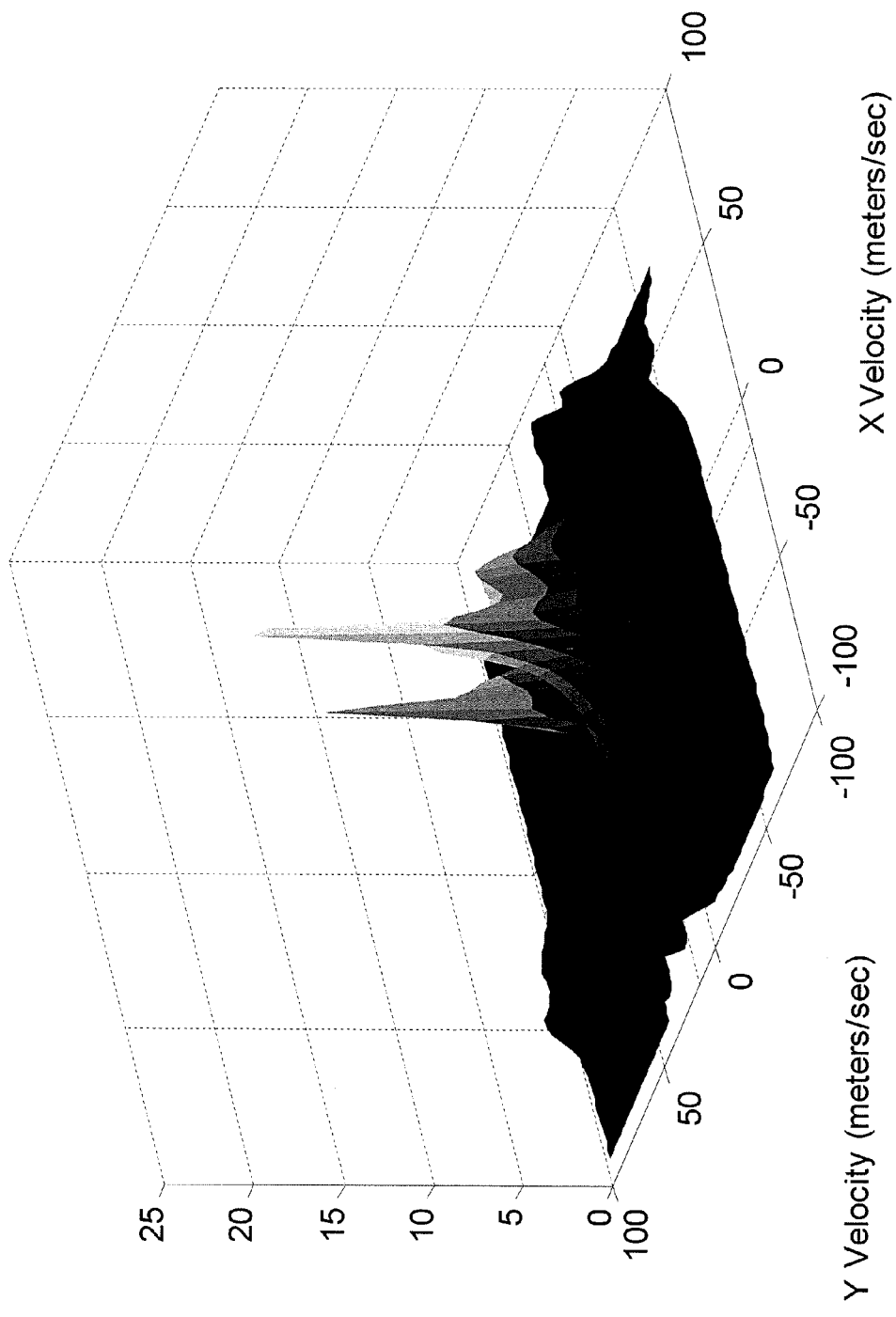
FIG. 16 is a three-dimensional plot illustrating the combined coherent MVDR target Cartesian velocity ($\dot{x}$, $\dot{y}$) for the three receivers of FIG. 9.

FIG. 16 is a three-dimensional plot illustrating the combined coherent MVDR target Cartesian velocity $(\dot{x}, \dot{y})$ for the three receivers of FIG. 9. The combined MVDR response as a function of postulated target velocity is shown in FIG. 16 (with the location held fixed at the true target location) for the same embodiment as the previous MVDR versus location results (see FIGS. 13-15). For ease of illustration, FIG. 16 shows the MVDR statistic (in dB) as a function of hypothetical x-y target velocity, with the hypothetical z velocity component and target position fixed at the true values. In contrast to the GLRT technique (for example, FIGS. 10-12), there are two ridges (corresponding to the target and to clutter) in the MVDR technique instead of the single target ridge that occurs in the GLRT technique. This is because the MVDR technique responds to both target and clutter, whereas the GLRT technique attempts to null the interfering clutter. In the combined multi-receiver response, this results in the appearance of two peaks: one corresponding to clutter, and one to the target, as can be observed in FIG. 16.

Analytical Performance Evaluation of the Coherent GLRT Statistic

Under the condition of perfect estimation of the underlying parameters in the coherent GLRT statistic, the probability density function (pdf) of the GLRT under the signal plus noise hypothesis is non-central chi-squared with 2 real degrees of freedom and noncentrality parameter (integrated signal-to-noise ratio (SNR)):

$$\lambda = |a_1|^2 \sum_{m=1}^{M} |g_m|^2 d_{sm}^H R_m^{-1} d_{sm},$$

where $a_1$ is the complex signal amplitude at the first receiver and the other terms are as described above. Under the noise-only hypotheses, the pdf is central chi-squared with 2 real degrees of freedom. This characterizes completely the probability density functions of the statistic under the two hypotheses and enables one to determine the probability of detection and probability of false alarms as a function of integrated signal-to-noise ratio given by $\lambda$ by using well-known methods given in A. D. Whalen, *Detection of Signals in Noise*, Academic Press, 1971.

Embodiments of the present invention improve over previous techniques for a number of reasons. For example, embodiments of the present invention combine the data from the multiple receivers by a pre-detection fusion method that expresses the unknown target position and velocity vectors in a fixed Cartesian coordinate system common to all the receivers, compute the bistatic range and Doppler shifts for all the receivers (for example, relative to a reference receiver), and combine them non-coherently or coherently via the appropriate statistic (for example, GLRT or MVDR). As such, considerable simulation results have demonstrated substantial improvements in the detection of slow moving targets and their geolocation estimation (especially in the presence of clutter) compared to existing methods.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A multistatic radar system comprising:
    a transmitter for transmitting a first signal at a first time to reflect off a target, the first signal reflecting off the target as a second signal at a second time;
    a plurality of spatially separated receivers on corresponding geographically separated platforms, each of the receivers being configured to receive the second signal from the target as one of a corresponding plurality of third signals and at one of a corresponding plurality of third times; and
    a signal processor for fusing the third signals and the third times from the receivers,
    wherein the fusing of the third signals and the third times comprises:
        aligning the third signals in time delay and Doppler shift using the corresponding plurality of third times; and
        summing the resulting aligned third signals to detect or geolocate the target at the second time.

2. The multistatic radar system of claim 1, wherein the summing of the resulting aligned third signals comprises non-coherently summing the resulting aligned third signals.

3. The multistatic radar system of claim 2, wherein the aligning of the third signals in time delay and Doppler shift comprises generating and applying a non-coherent Generalized Likelihood Ratio Test (GLRT) statistic.

4. The multistatic radar system of claim 1, wherein the summing of the resulting aligned third signals comprises coherently summing the resulting aligned third signals.

5. The multistatic radar system of claim 4, wherein the aligning of the third signals in time delay and Doppler shift comprises generating and applying a coherent Generalized Likelihood Ratio Test (GLRT) statistic.

6. The multistatic radar system of claim 4, wherein the aligning of the third signals in time delay and Doppler shift comprises generating and applying a coherent minimum variance distortionless response (MVDR) statistic.

7. The multistatic radar system of claim 1, wherein the aligning of the third signals in time delay and Doppler shift comprises modeling location and velocity vectors of the target.

8. The multistatic radar system of claim 1, wherein the fusing of the third signals and the third times comprises representing a state vector of the target in a centralized Cartesian coordinate system over all of the receivers.

9. The multistatic radar system of claim 1, wherein the detection or geolocation of the target is decided when the summing of the resulting aligned third signals exceeds a threshold.

10. The multistatic radar system of claim 1, wherein the target comprises a moving target in clutter, and the fusing of the third signals and the third times comprises detecting or geolocating the target in the clutter.

11. A method of detection and geolocation of a target by a multistatic radar system comprising a transmitter, a plurality of spatially separated receivers on corresponding geographically separated platforms, and a signal processor, the method comprising:
transmitting a first signal at a first time from the transmitter to the target, the first signal reflecting off the target as a second signal at a second time;
receiving the second signal in the receivers on the corresponding geographically separated platforms, each of the receivers receiving the second signal from the target as one of a corresponding plurality of third signals and at one of a corresponding plurality of third times; and
fusing the third signals and the third times from the receivers on the signal processor, comprising:
aligning the third signals in time delay and Doppler shift using the corresponding plurality of third times; and
summing the resulting aligned third signals to detect or geolocate the target at the second time.

12. The method of claim 11, wherein the summing of the resulting aligned third signals comprises non-coherently summing the resulting aligned third signals.

13. The method of claim 12, wherein the aligning of the third signals in time delay and Doppler shift comprises generating and applying a non-coherent Generalized Likelihood Ratio Test (GLRT) statistic.

14. The method of claim 11, wherein the summing of the resulting aligned third signals comprises coherently summing the resulting aligned third signals.

15. The method of claim 14, wherein the aligning of the third signals in time delay and Doppler shift comprises generating and applying a coherent Generalized Likelihood Ratio Test (GLRT) statistic.

16. The method of claim 14, wherein the aligning of the third signals in time delay and Doppler shift comprises generating and applying a coherent minimum variance distortionless response (MVDR) statistic.

17. The method of claim 11, wherein the aligning of the third signals in time delay and Doppler shift comprises modeling location and velocity vectors of the target.

18. The method of claim 11, wherein the fusing of the third signals and the third times comprises representing a state vector of the target in a centralized Cartesian coordinate system over all the receivers.

19. The method of claim 11, wherein the detection or geolocation of the target is decided when the summing of the resulting aligned third signals exceeds a threshold.

20. The method of claim 11, wherein the target comprises a moving target in clutter, and the fusing of the third signals and the third times comprises detecting or geolocating the target in the clutter.

* * * * *